United States Patent
DeVries et al.

(10) Patent No.: US 8,312,986 B2
(45) Date of Patent: Nov. 20, 2012

(54) REMOVABLE CARTRIDGE CLEANER

(75) Inventors: Brett E. DeVries, Comstock Park, MI (US); Daniel J. Kuiper, Alto, MI (US); Carl J. Hessler, Rockford, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 13/168,190

(22) Filed: Jun. 24, 2011

(65) Prior Publication Data
US 2011/0247915 A1 Oct. 13, 2011

Related U.S. Application Data

(62) Division of application No. 12/421,988, filed on Apr. 10, 2009, now Pat. No. 7,987,966.

(60) Provisional application No. 61/044,050, filed on Apr. 10, 2008.

(51) Int. Cl.
*B65G 45/12* (2006.01)
(52) U.S. Cl. ........................................ 198/497
(58) Field of Classification Search .......... 198/496–499
See application file for complete search history.

(56) References Cited

U.S. PATENT DOCUMENTS

| | | | | |
|---|---|---|---|---|
| 4,249,650 A * | 2/1981 | Stahura | ........................ | 198/499 |
| 4,529,084 A * | 7/1985 | Zhang | ........................ | 198/499 |
| 4,533,035 A * | 8/1985 | Reiter | ........................ | 198/499 |
| 4,620,627 A * | 11/1986 | Griffiths | ........................ | 198/580 |
| 4,696,389 A | 9/1987 | Schwarze | | |
| 4,825,996 A * | 5/1989 | Davidts | ........................ | 198/497 |
| 4,953,689 A * | 9/1990 | Peterson et al. | ........................ | 198/497 |
| 5,727,670 A * | 3/1998 | Johnson | ........................ | 198/497 |
| 6,056,112 A * | 5/2000 | Wiggins | ........................ | 198/499 |
| 6,315,105 B1 * | 11/2001 | Gibbs et al. | ........................ | 198/497 |
| 6,321,901 B1 * | 11/2001 | Strebel et al. | ........................ | 198/499 |
| 6,581,754 B2 * | 6/2003 | Law | ........................ | 198/499 |
| 6,860,378 B1 | 3/2005 | Johannsen | | |
| 6,929,112 B2 * | 8/2005 | Hall | ........................ | 198/499 |
| 7,007,794 B2 * | 3/2006 | Waters et al. | ........................ | 198/497 |
| 7,093,706 B2 * | 8/2006 | DeVries et al. | ........................ | 198/499 |
| 7,216,756 B2 * | 5/2007 | Swinderman | ........................ | 198/499 |
| 7,308,980 B2 * | 12/2007 | Peterson et al. | ........................ | 198/617 |

(Continued)

OTHER PUBLICATIONS

Notification of Transmittal of the International Search Report and the Written Opinion of the International Searching Authority, or the Declaration from the International Bureau of WIPO for International Application No. PCT/US2009/040204 dated Jun. 8, 2009, 13 pages.

(Continued)

*Primary Examiner* — Joseph A Dillon, Jr.
(74) *Attorney, Agent, or Firm* — Fitch Even Tabin & Flannery, LLP

(57) ABSTRACT

A removable cartridge cleaner assembly is provided that allows for faster and easier removal of the belt cleaner blades out from under a conveyor belt. In one aspect the assembly includes a biasing surface of one of an elongate support assembly and a channel member configured to be engaged by a securing member and urge distal ends of legs of the channel member into tight engagement with the elongate support assembly and minimize debris accumulation therebetween. In another aspect, the elongate base member and rail member each include lateral portions configured to slidably engage corresponding wedge portions to urge the rail member toward the base member. A method of installing a belt cleaner assembly is also provided which includes camming a rail member downwardly toward the support member upper surface.

10 Claims, 26 Drawing Sheets

U.S. PATENT DOCUMENTS

| | | | |
|---|---|---|---|
| 7,367,443 B2 * | 5/2008 | Swinderman | 198/497 |
| 7,370,750 B2 * | 5/2008 | Swinderman | 198/497 |
| 7,740,127 B2 * | 6/2010 | Swinderman et al. | 198/499 |
| 7,987,966 B2 * | 8/2011 | Devries et al. | 198/497 |
| 2006/0131136 A1 | 6/2006 | Smith et al. | |
| 2008/0251358 A1 | 10/2008 | Thew | |
| 2010/0000842 A1 | 1/2010 | DeVries et al. | |
| 2011/0203904 A1 | 8/2011 | Kuiper et al. | |

OTHER PUBLICATIONS

Notification of Transmittal of the International Search Report and the Written Opinion of the International Searching Authority, or the Declaration from the International Bureau of WIPO for International Application No. PCT/US2011/026379 dated Apr. 28, 2011, 10 pages.

Martin® Orion Belt Cleaning Systems®—Belt Cleaners, Form No. L3719-07/08 (2005, 2008) (2 pages).

Martin® Orion Belt Cleaning Systems®—Orion 2000 and H20-4000 Belt Cleaners Operator's Manual M3702 (2005, 2009) (42 pages).

Martin® Orion Belt Cleaning Systems®—Orion 2000 Secondary Cleaner, Form No. L3709-06/08 (2005, 2008) (2 pages).

* cited by examiner

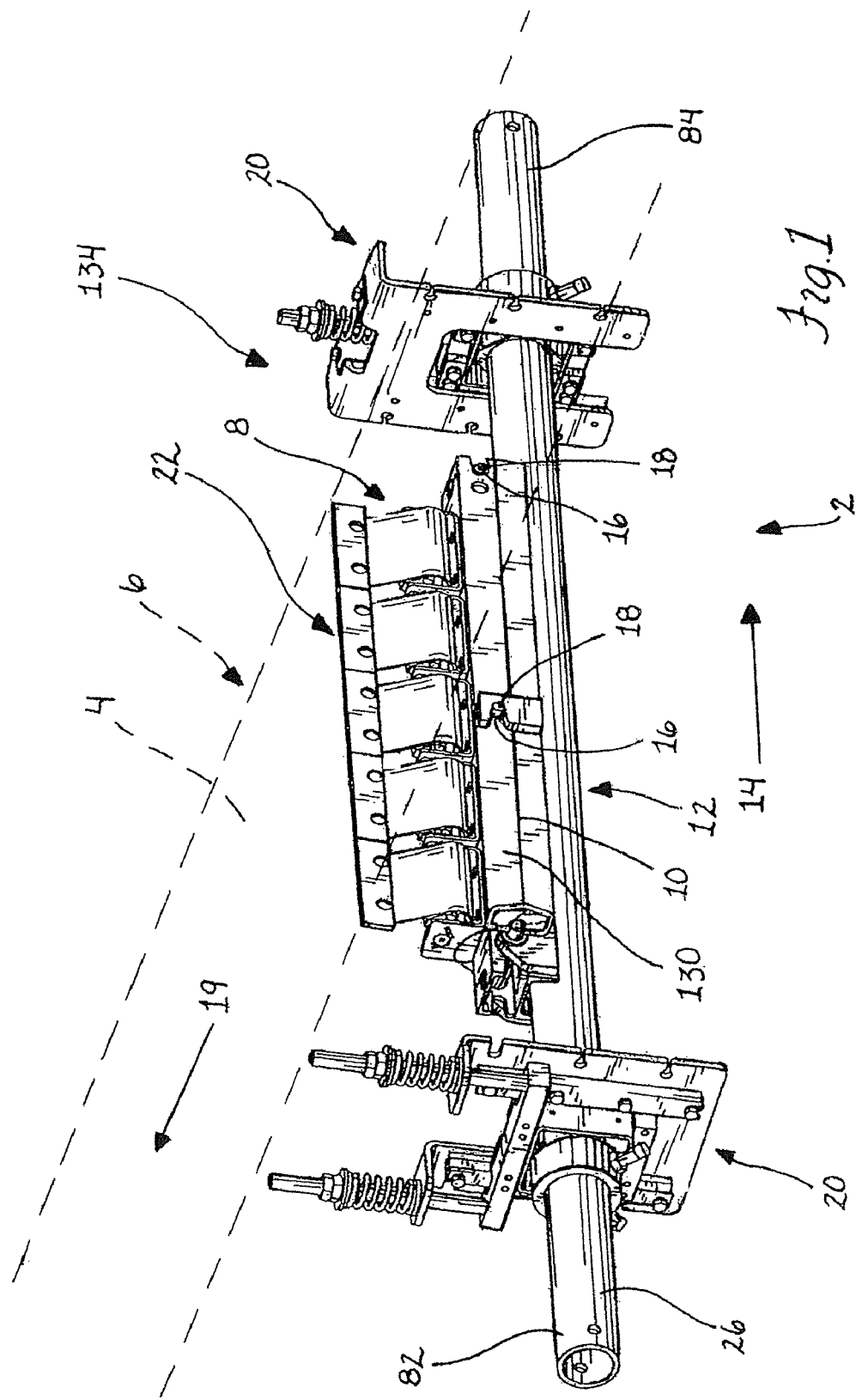

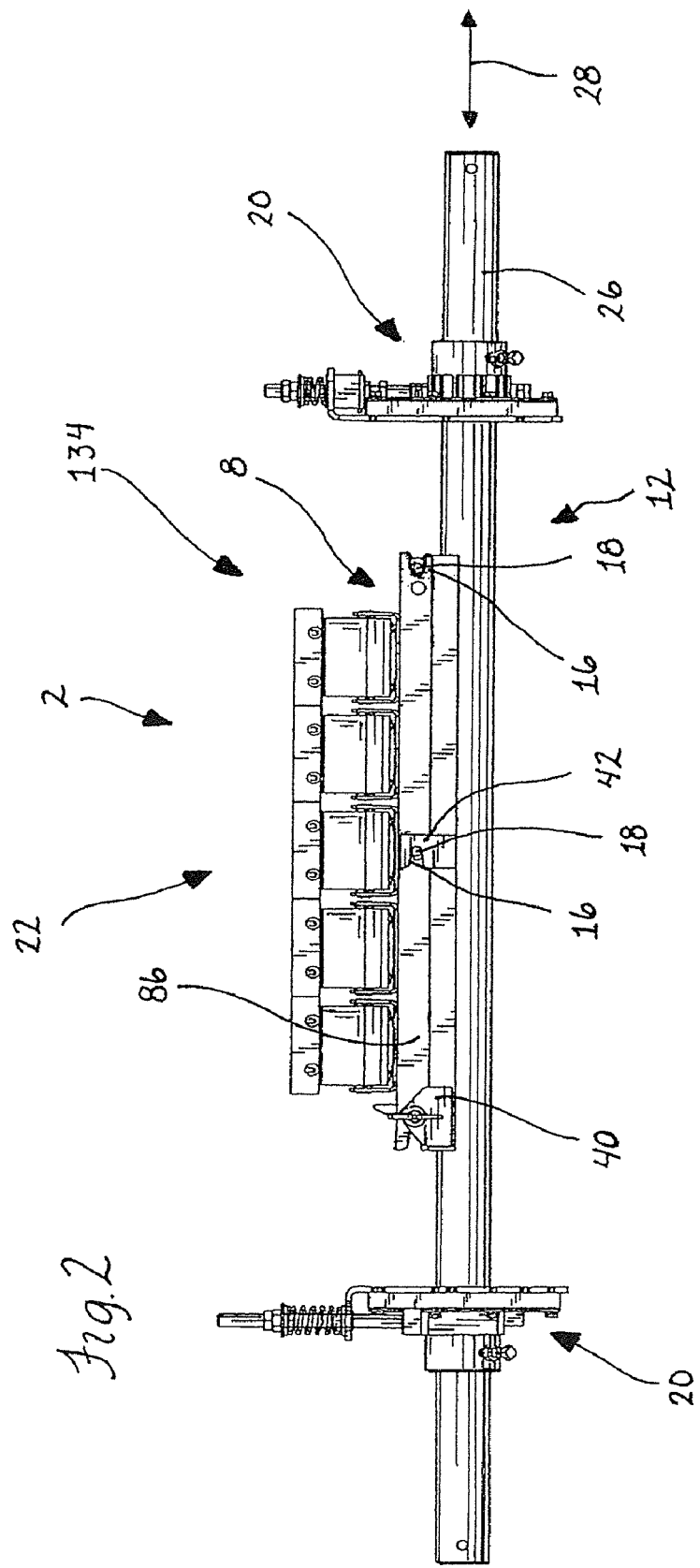

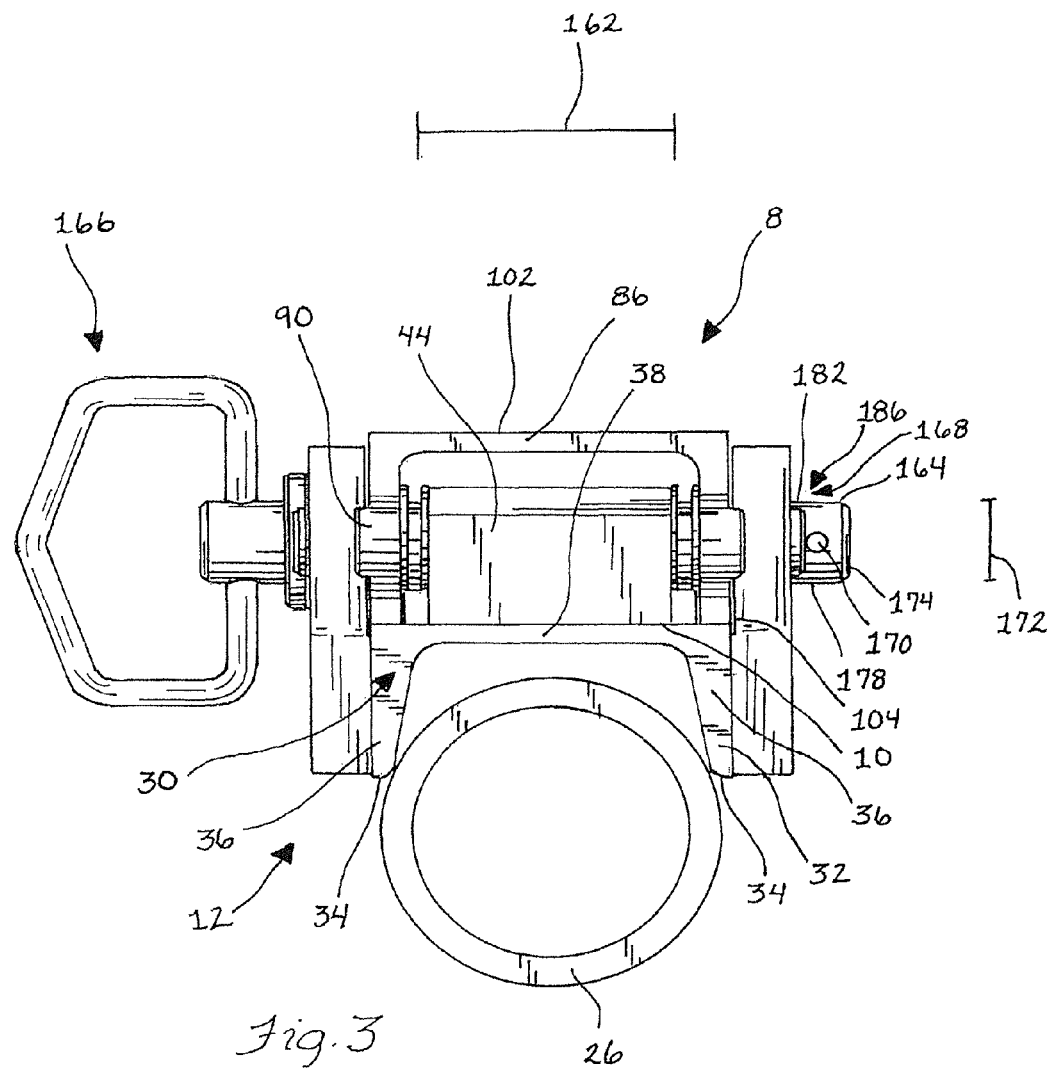

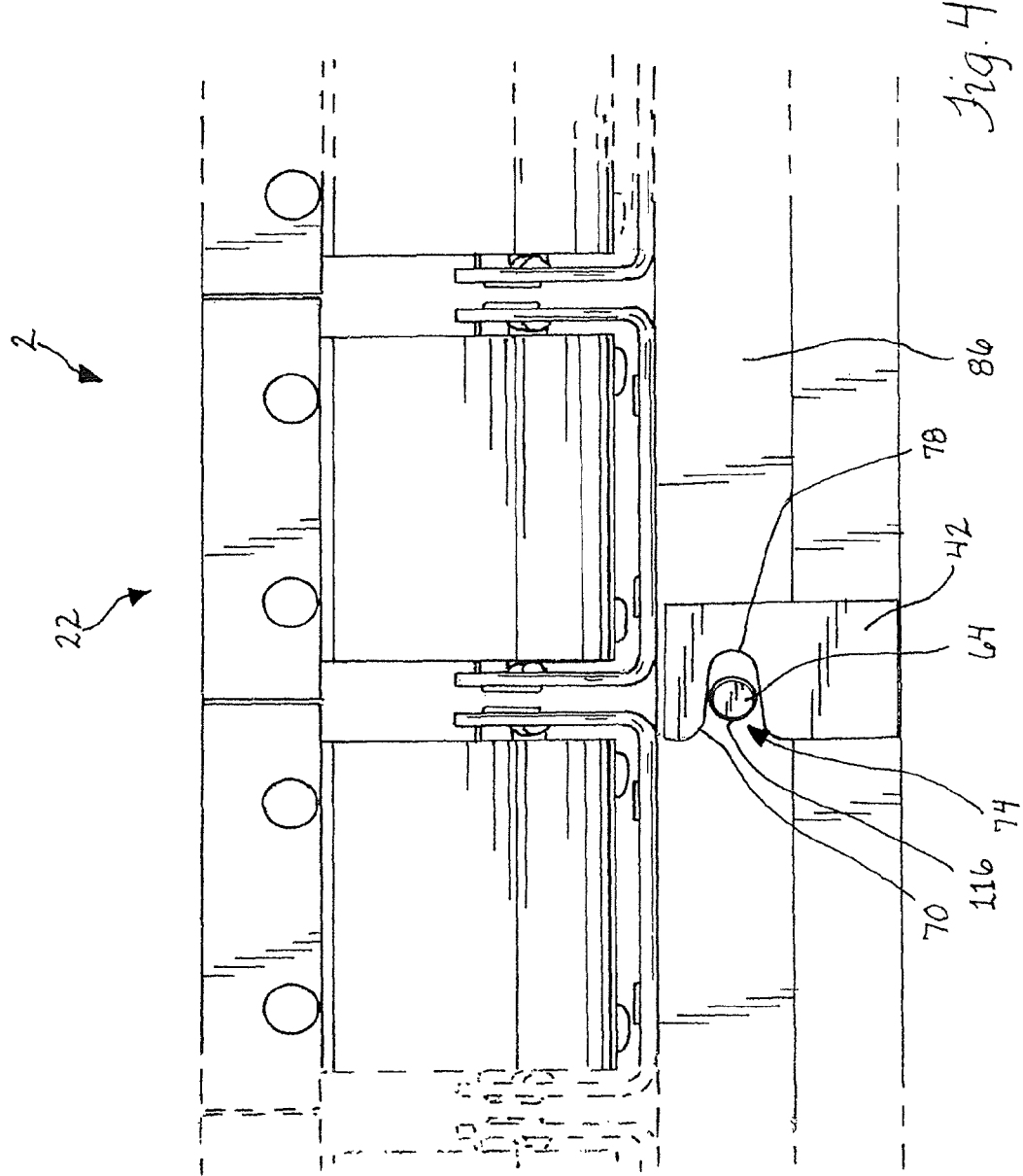

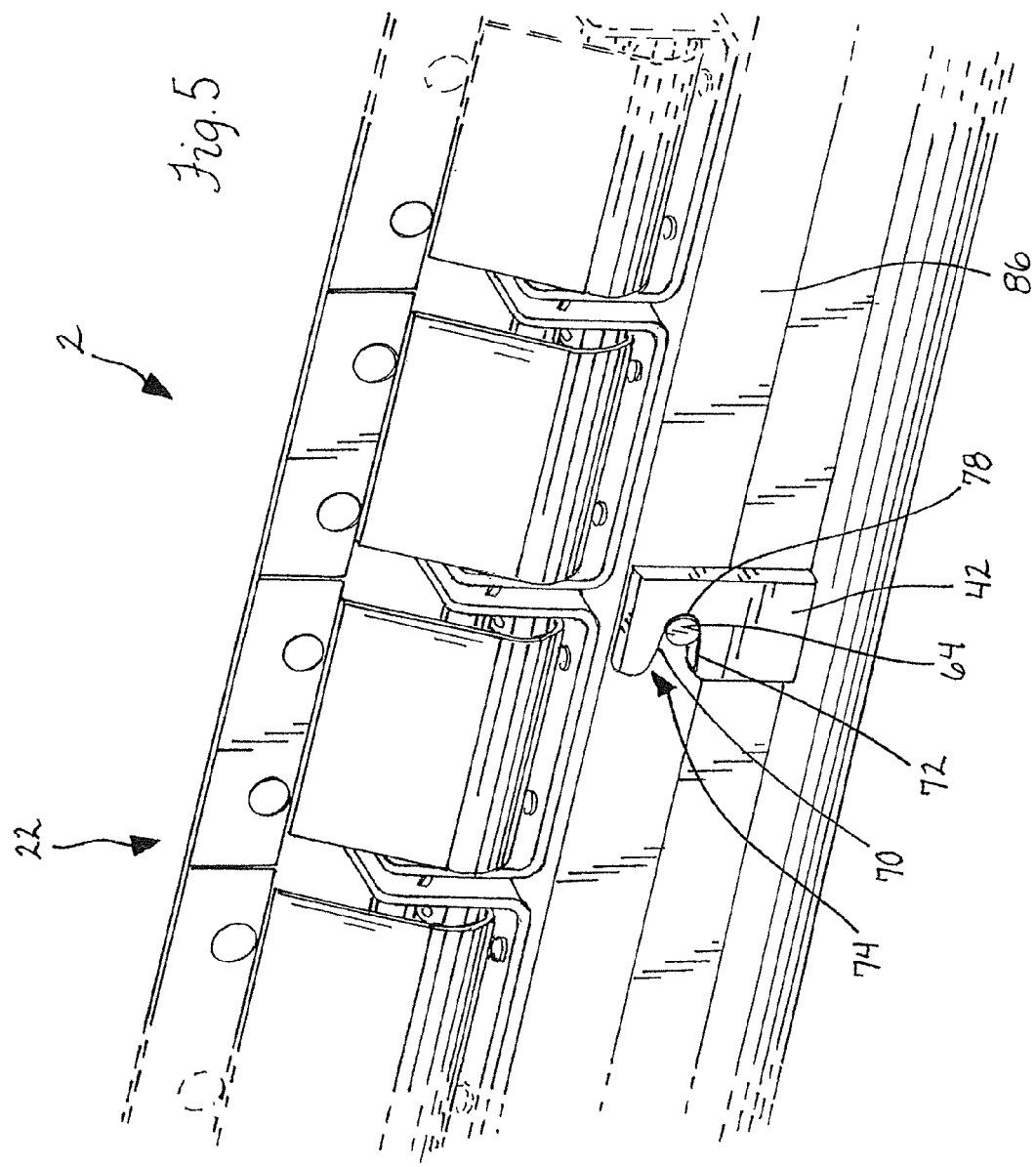

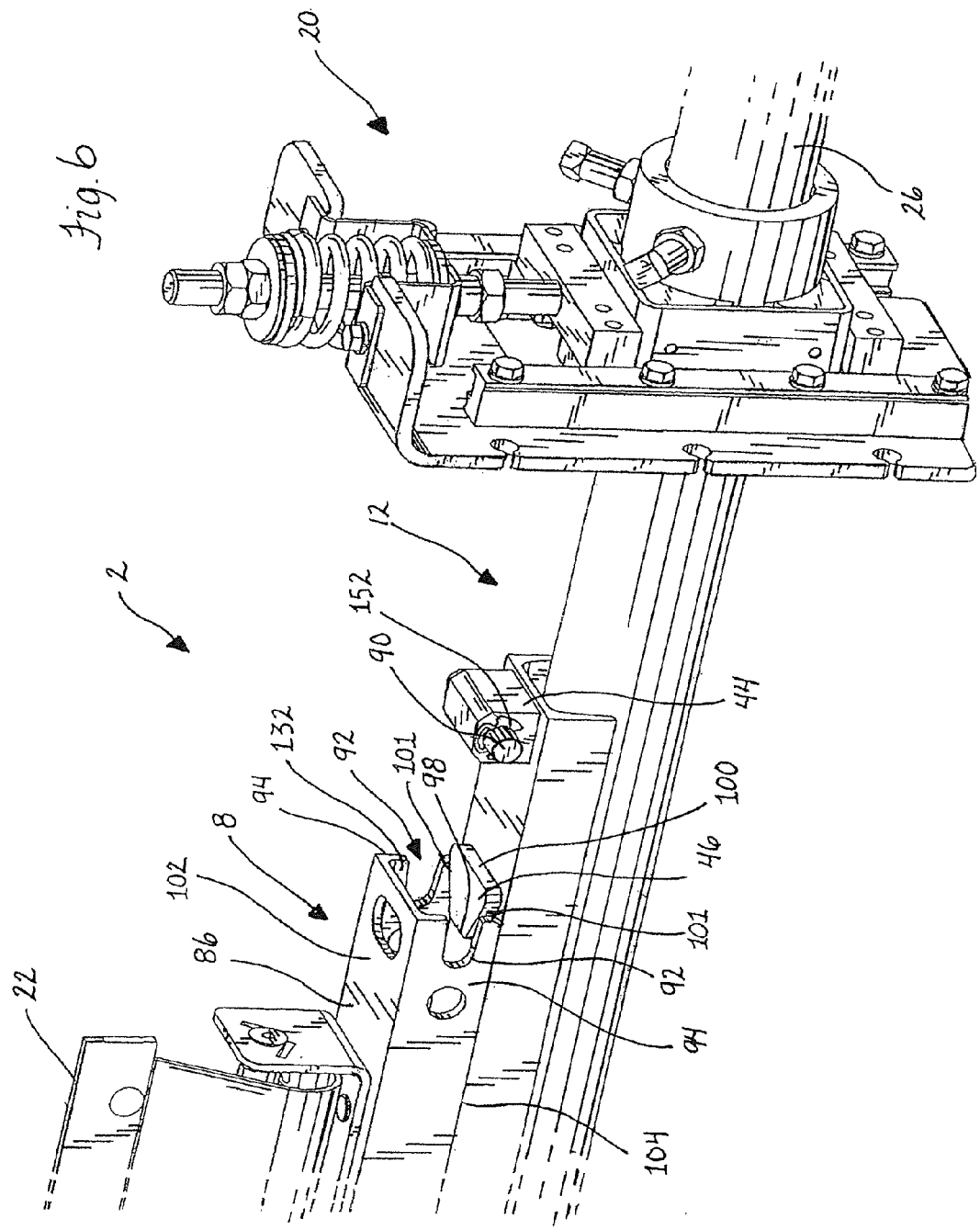

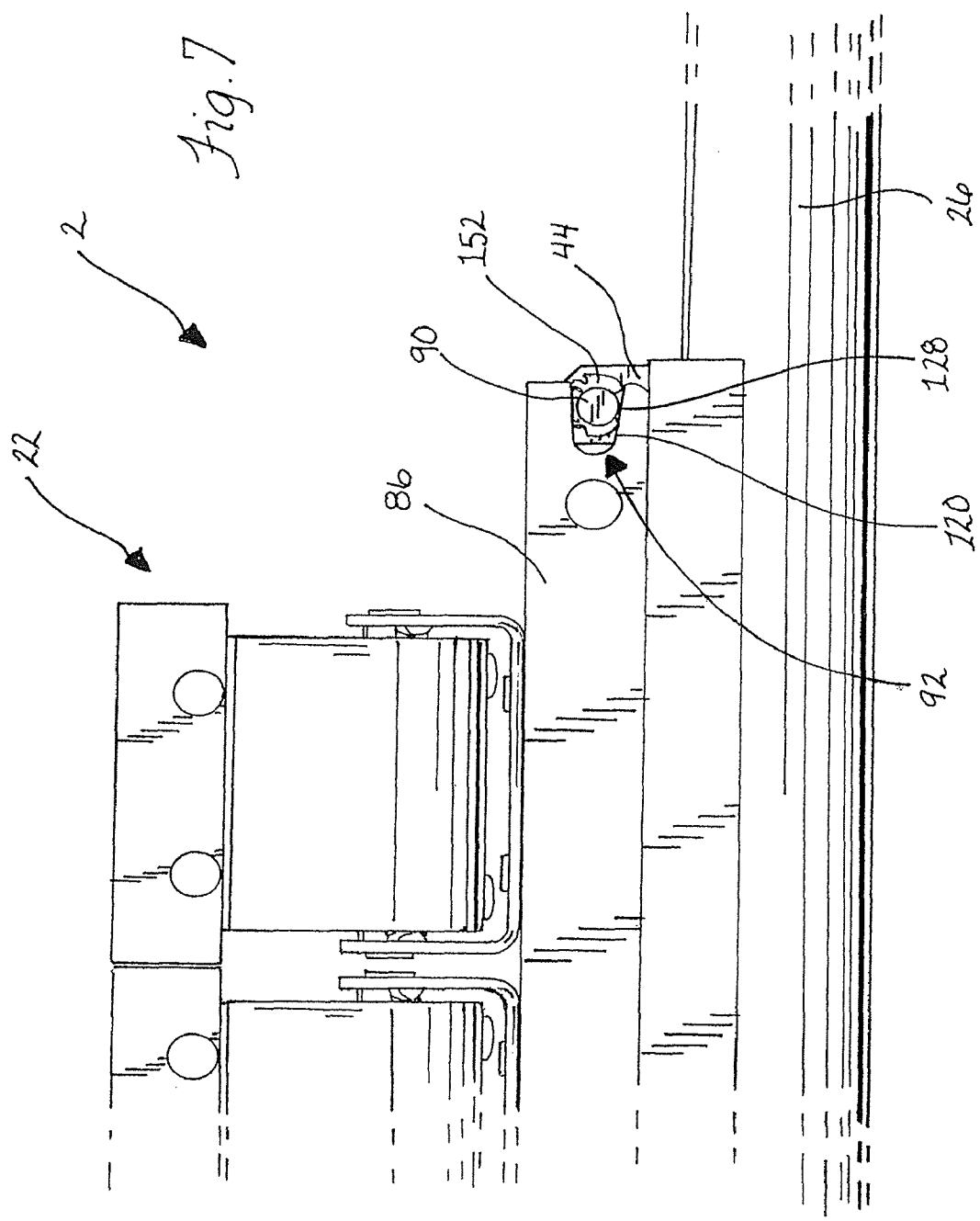

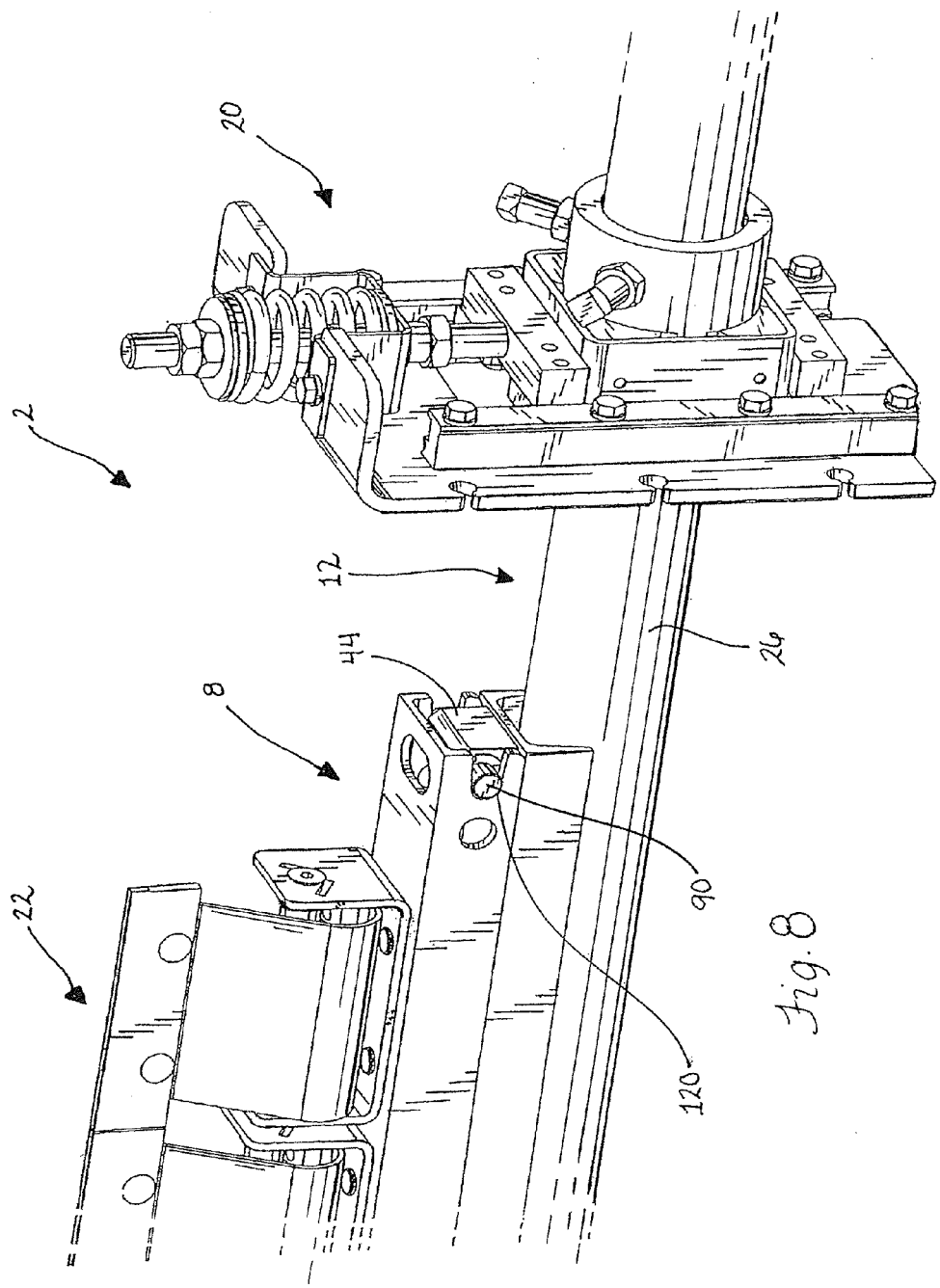

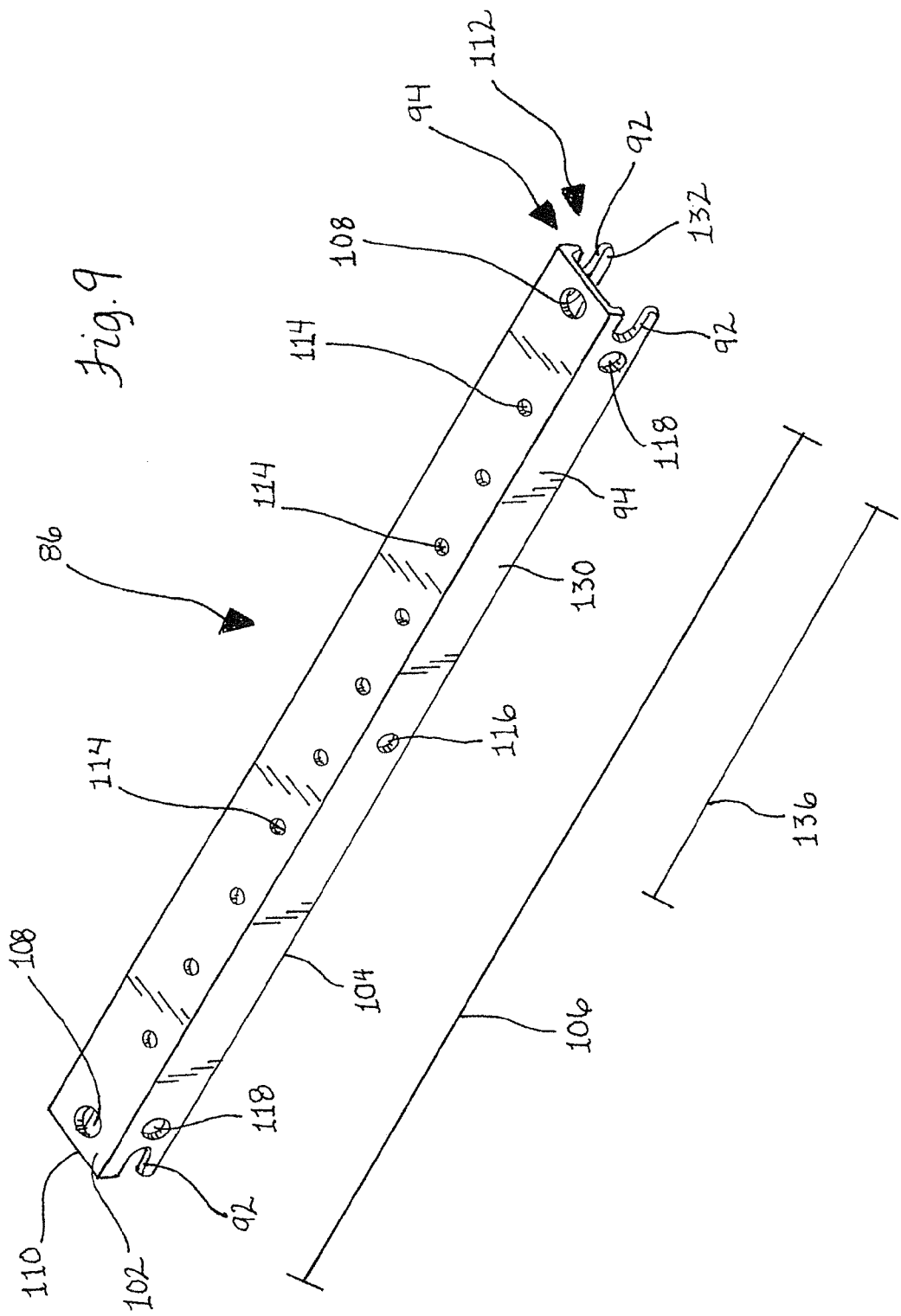

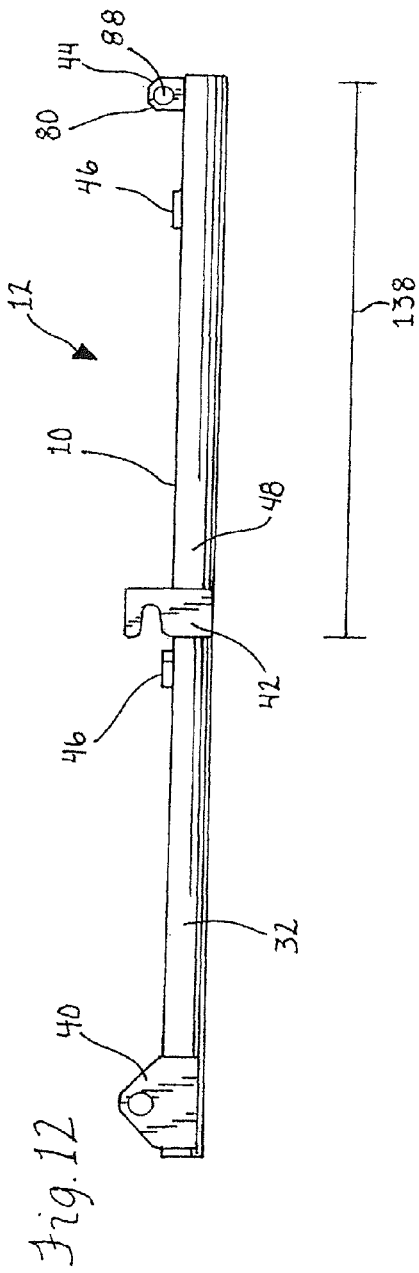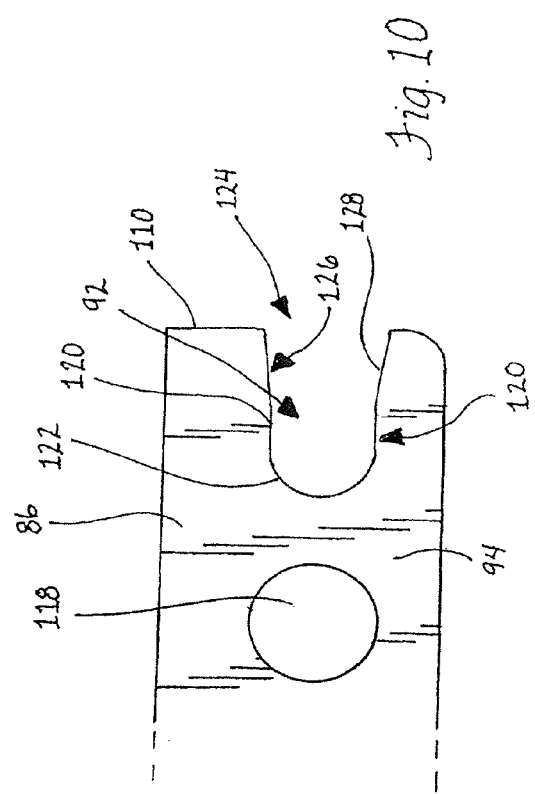

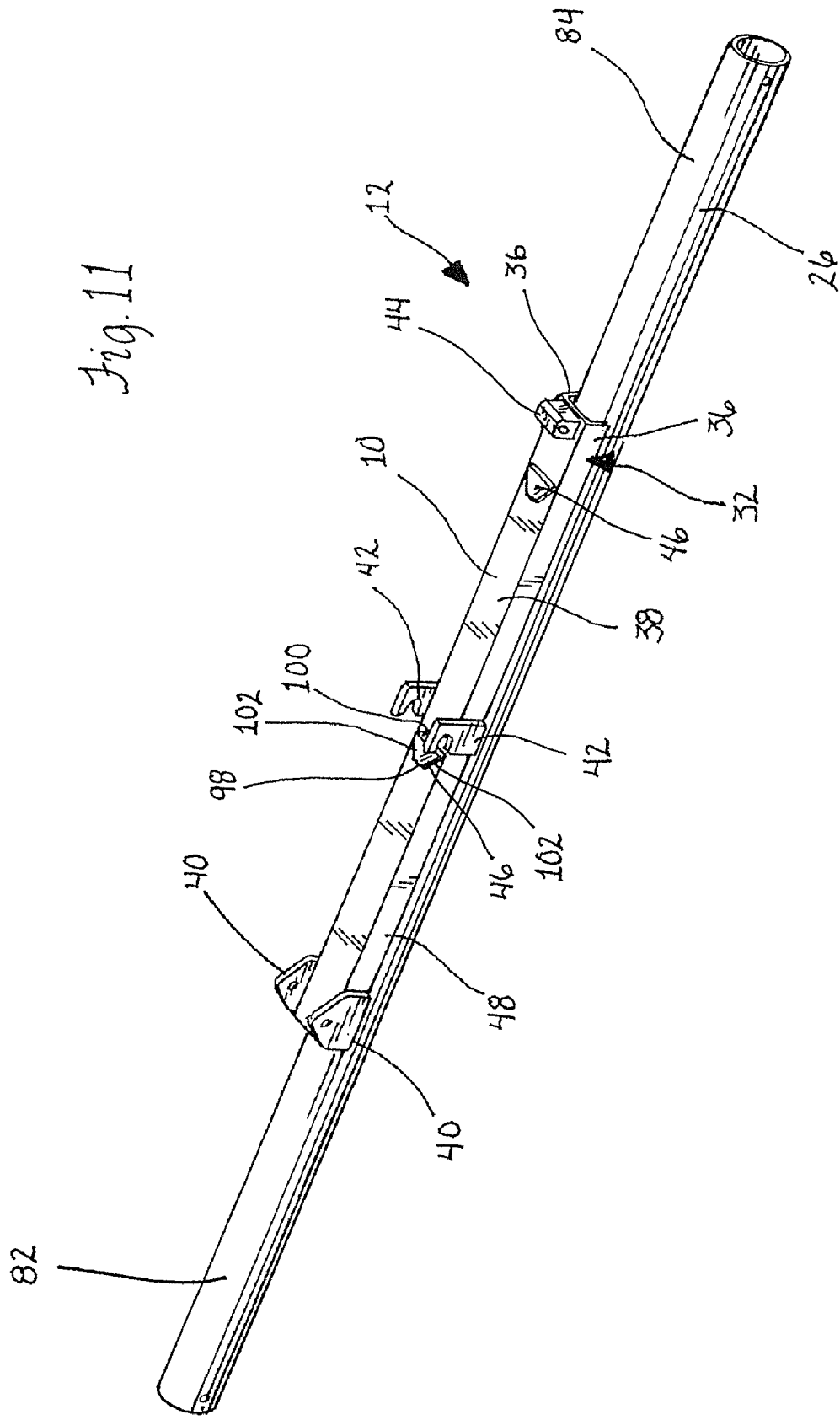

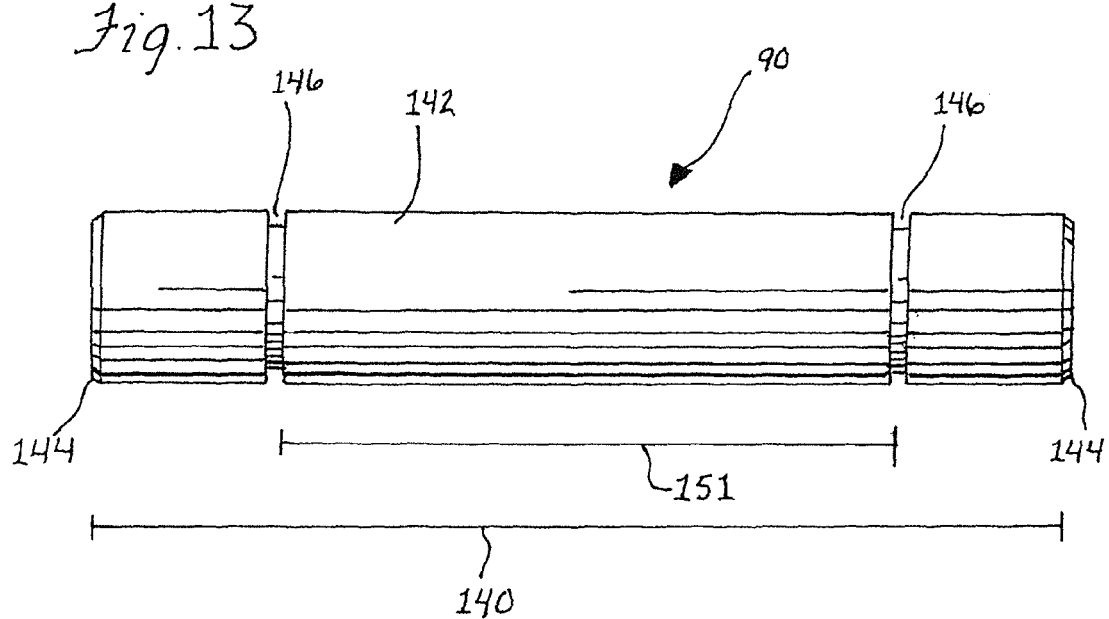
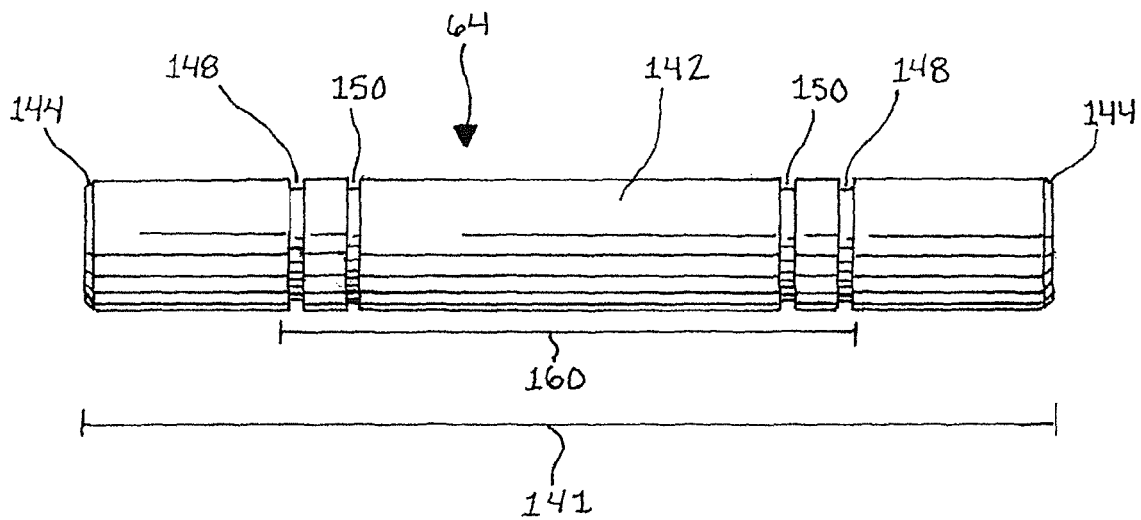

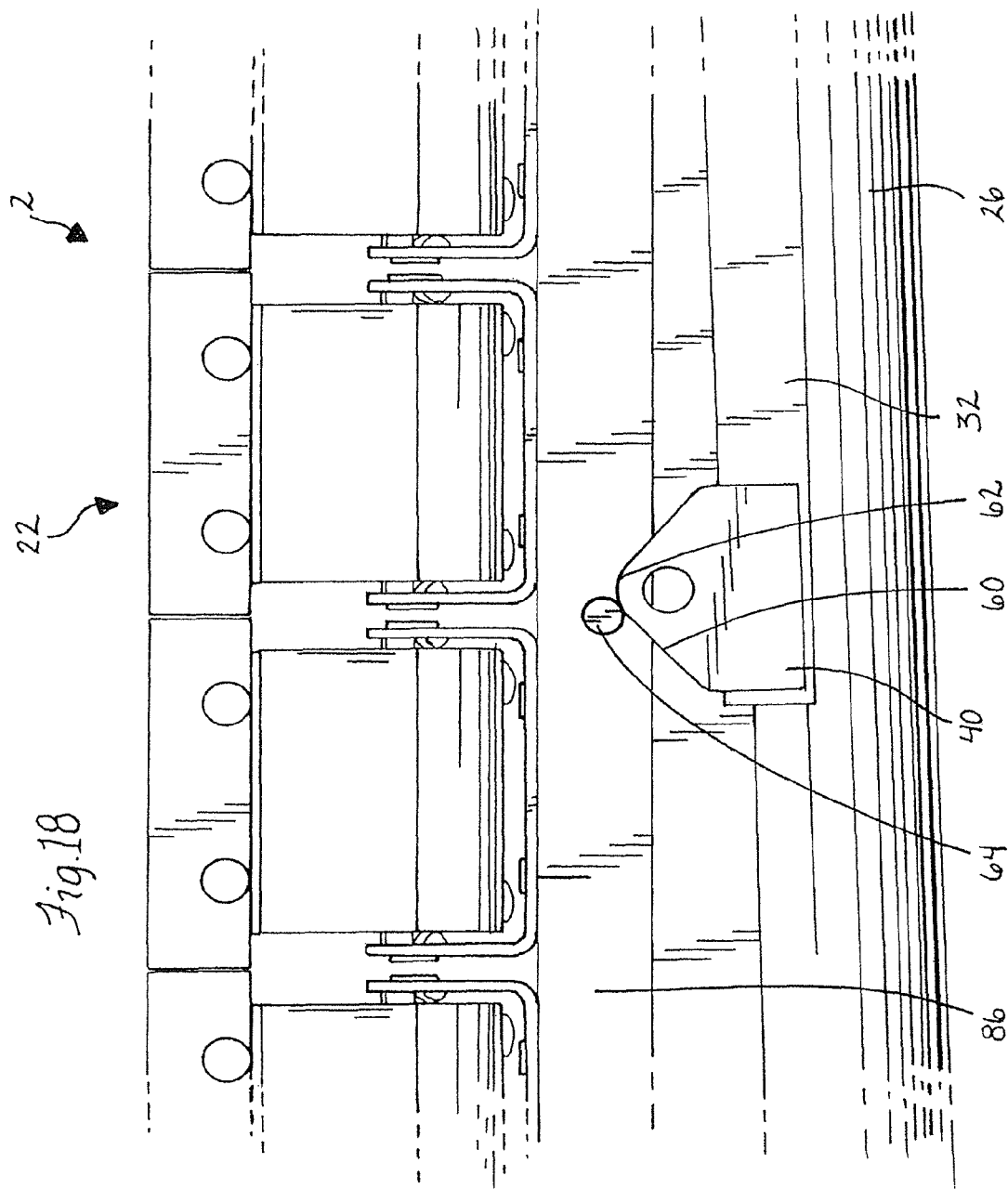

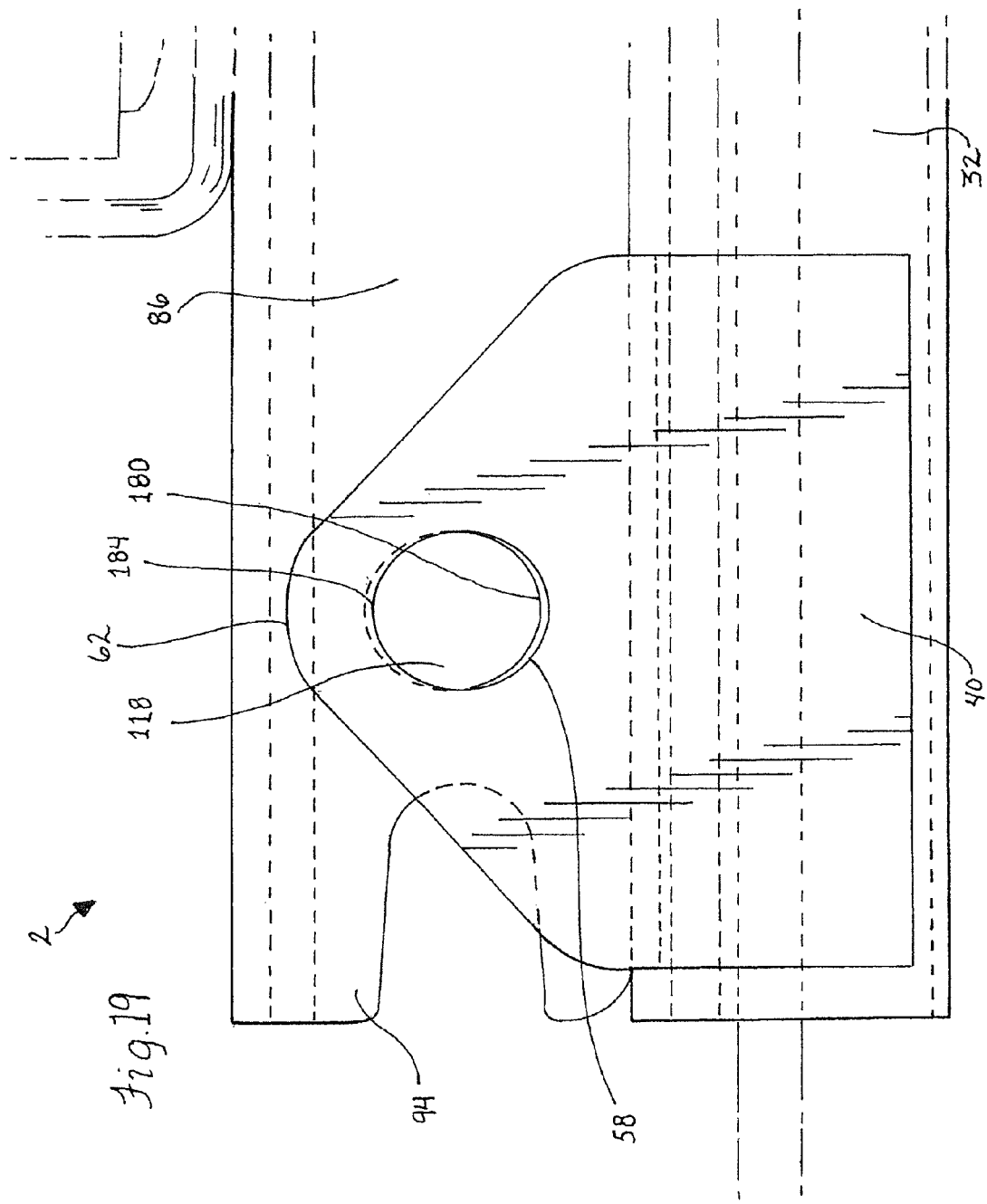

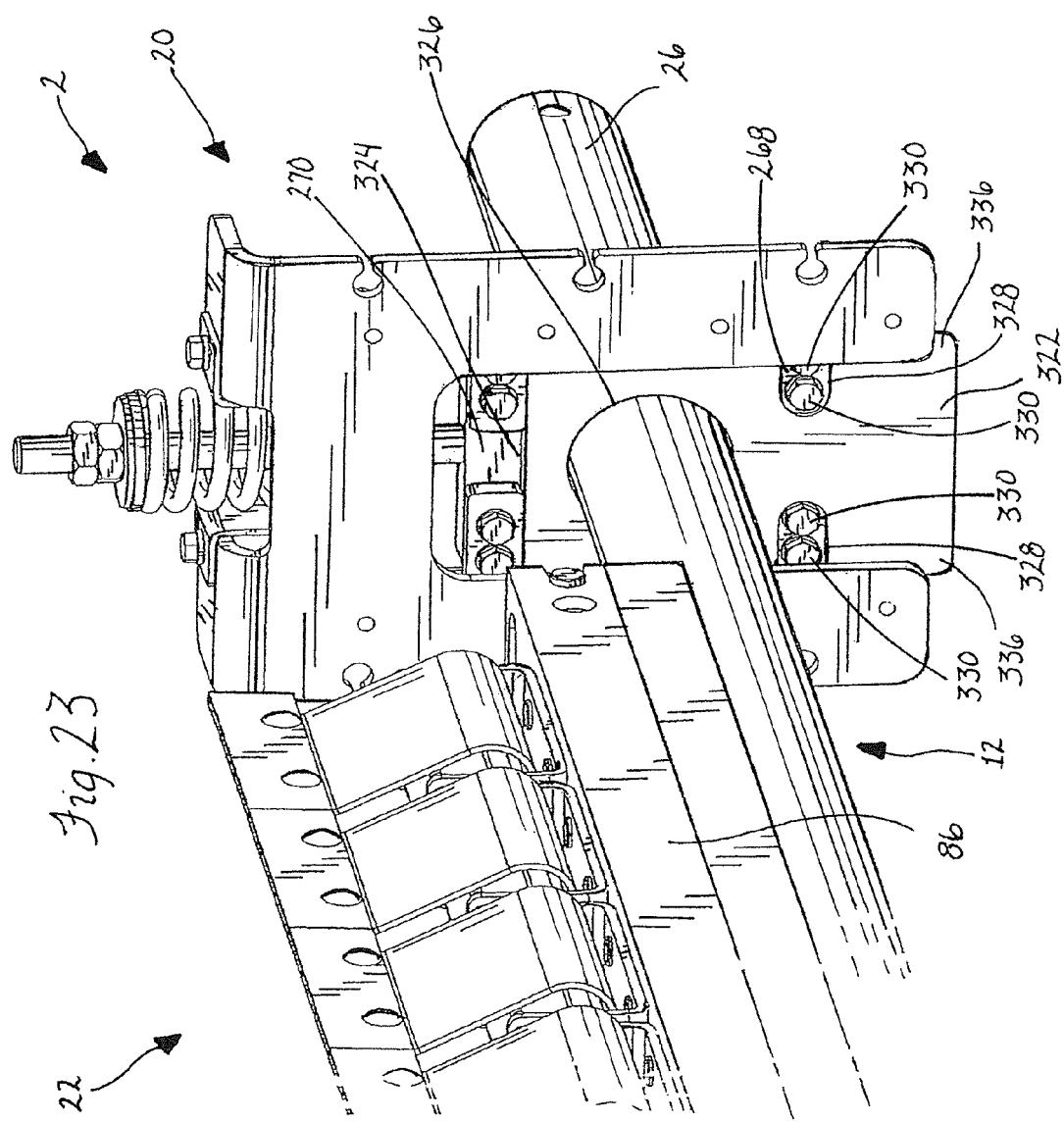

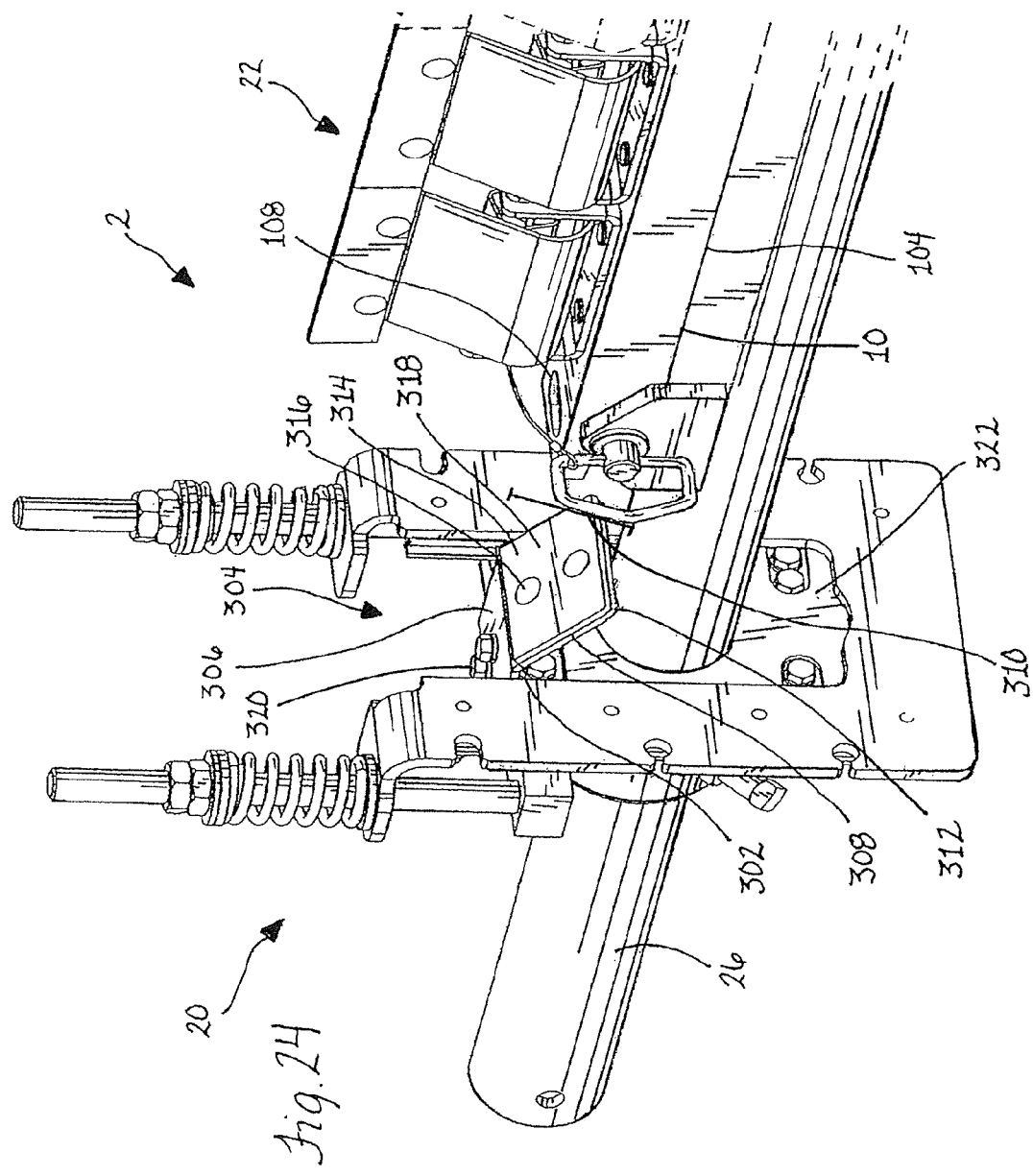

REMOVABLE CARTRIDGE CLEANER

CROSS-REFERENCE TO RELATED APPLICATIONS

This application is a divisional of prior U.S. application Ser. No. 12/421,988, filed Apr. 10, 2009, which claims the benefit of the filing date of U.S. Provisional Application 61/044,050, filed Apr. 10, 2008, which are all hereby incorporated herein by reference in their entirety.

FIELD OF THE INVENTION

The invention relates to a cleaner assembly for a conveyor belt and, more particularly, to a cleaner assembly that can be easily installed under a conveyor belt and removed therefrom.

BACKGROUND OF THE INVENTION

A variety of industries utilize conveyor belts to transport goods and materials from one place to another. Generally, material is deposited onto the upstream end of the upper or carry run of a belt and is discharged at the downstream end of the carry run of the belt. However, small amounts of material often remain adhered to the belt surface. That material can remain adhered as the belt travels along the lower or return run and back to the carry run. As is known, it is desirable to scrape the belt clean so that it is free of material adhered thereto.

Secondary belt cleaners are mounted downstream of the head pulley under the conveyor belt. Generally the belt cleaners are operatively mounted to an elongate mounting pole that extends below and across the belt. The cleaning blades of the belt cleaners are biased into engagement with the conveyor belt and remove the material adhered thereto.

Resilient mounts located at either end of the elongate pole or support member provide limited vertical and/or rotational movement to minimize damage to the belt and splices formed therealong and maximize material removal. Examples of resilient mounts include spring tensioners and pneumatic tensioners. In addition, resiliently mounted cleaning blades further minimize belt damage and maximize material removal. The resilient mounts typically bias the cleaning blades into engagement with the belt. In addition, the cleaning blades move with the conveyor belt as the cleaning blades encounter surface irregularities, such as metallic belt fasteners used to splice the conveyor belt.

Over time the cleaning blades of belt cleaners require maintenance and/or replacement. Some prior belt cleaners include elongate members removably mounted to the resilient mounts, allowing an operator to remove the elongate member and cleaning blades out from under the conveyor belt to perform maintenance. However, this configuration requires that the operator have access to both ends of the belt scraper assembly to dismount the elongate member. Further, due to the weight and size of the elongate support, removal and reinstallation may require several operators and/or mechanical assistance.

Recent belt cleaners include cleaner blades configured to be laterally translated along the elongate member, thereby allowing an operator to remove and replace the cleaner blades out from under the conveyor belt without having to remove the elongate support member. Further, the operator only needs access to one side of the belt cleaner to remove and replace the cleaner blades. In one prior belt cleaner, disclosed in U.S. Pat. No. 4,249,650 to Stahura, several blade members are linked together to form a single unit under the conveyor belt. This approach requires an operator to individually remove each blade member from the elongate support member, then individually reinstall each blade member on the elongate support assembly. As a result, the operator is required to work below the belt for an extended period of time, during which the belt should be rendered inoperable. Space constraints adjacent the belt scraper assembly could further impede timely maintenance activities.

In other belt cleaners, the scraper blades are mounted onto a removable cartridge member or rail member. In one such configuration, such as described in U.S. Pat. No. 6,581,754 to Law, the rail member defines a cavity extending along its length to receive the elongate support therein. The belt scraper assembly is configured to have clearance between the larger rail member cavity and the smaller elongate support extending along the lengths thereof. The clearance eases installation of the rail member on the elongate support and minimizes friction therebetween. However, material removed from the conveyor belt readily can collect in the clearance. Material accumulated in the clearance adheres to both the rail member and the elongate support along the lengths thereof and effectively binds the rail member to the support so that the belt cleaner cannot be easily manually removed if it is able to be manually removed at all. As a result, an operator must provide sufficient force to overcome the strength of the material adhering the rail member to the elongate support, such as by application of multiple mallet blows to the end of the rail member.

Thus, prior belt scraper assemblies suffer from problems with providing simple and quick maintenance in an environment which is subjected to loose material passing therethrough.

SUMMARY OF THE INVENTION

In accordance with one aspect of the invention, a removable cartridge cleaner assembly is provided that allows for faster and easier removal of the belt cleaner blades out from under the conveyor belt. The present removable cartridge cleaner provides a tight engagement between the removable rail member and the elongate support assembly to minimize debris accumulation, as compared to prior cartridge cleaner assemblies which have a loose fit between the removable rail members and the support member, thereby providing spaces and/or gaps which allow debris and other material to collect therein. Such debris solidifies over time and effectively glues the removable channel member in place.

The present removable cartridge cleaner assembly includes an elongate rail or channel member and an elongate support assembly. Lower, free ends of legs of the channel member are configured to slide along an upper surface of the elongate support assembly. An opening of one of the channel member and support assembly includes a biasing surface configured to engage a securing portion of one of the channel member and support assembly and thereby urge the elongate channel member toward the elongate support assembly as the channel member is shifted to an operative position. In the operative position, any space at the interface between the elongate channel member and the elongate support assembly is minimized or eliminated. As a result, the interface between the channel member and elongate support is substantially free of debris, thereby allowing the elongate channel member to freely be shifted along the upper surface of the elongate support assembly. Accordingly, an operator can easily and quickly perform maintenance on the removable cartridge cleaner assembly.

In another aspect, the present removable cartridge cleaner assembly includes a rail member slidably mounted on an elongate base member. Both the rail member and base member include lateral portions extending in the belt travel direction configured to engage inclined wedge portions of both the rail member and base member. In this manner, as the lateral portions engage the wedge portions, the rail member is urged toward the base member. Accordingly, space available for the accumulation of debris is reduced. Further, removal and installation of the rail member on the base member is quicker and easier as the interface between the rail member and base member is minimized and relatively free of debris.

In another aspect of the invention, a method for installing a rail member having belt cleaner blades secured thereto is provided that allows for faster and easier removal of the rail member from under the conveyor belt. In this regard, the rail member is slidable along an upper mounting surface of an elongate support member. Engagement of an inclined surface of a receiving portion with a securing portion urges the rail member towards the elongate support and restricts shifting of the rail member beyond the desired operative position. In this manner, the rail member is in tight engagement with the elongate support. Accordingly, the tight engagement of the rail member and elongate support member minimizes the accumulation of debris therebetween and provides for easier and faster servicing of the rail member.

BRIEF DESCRIPTION OF THE DRAWINGS

FIG. 1 is a perspective view of a removable cartridge cleaner assembly resiliently mounted below the return run of a conveyor belt shown in phantom;

FIG. 2 is a side elevational view of the removable cartridge cleaner assembly of FIG. 1 showing the elongate cartridge assembly in the operable orientation and the lower surfaces of the legs of the elongate channel member in tight, flush engagement with the flat upper surface of the elongate support assembly;

FIG. 3 is an end elevational view of the elongate channel member and elongate support assembly of the removable cartridge cleaner assembly of FIG. 1 showing the tight, flush engagement between the lower surfaces of the legs of the elongate rail member and the flat upper surface of the elongate support assembly;

FIG. 4 is an enlarged side elevational view of the elongate channel member and elongate support assembly of the removable cartridge cleaner assembly of FIG. 1 showing the central pin member of the elongate channel member in engagement with the upper inclined surface of the tapered slot of the central lug mount portion of the elongate support assembly;

FIG. 5 is an enlarged perspective view of the elongate channel member and elongate support assembly of the removable cartridge cleaner assembly of FIG. 1 showing the central pin member of the elongate channel member in engagement with closed end of the tapered slot of the central lug mount portion of the elongate support assembly;

FIG. 6 is an enlarged perspective view of the elongate channel member and elongate support assembly of the removable cartridge cleaner assembly of FIG. 1 showing the guide member being received between the depending legs of the elongate channel member;

FIG. 7 is an enlarged side elevational view of the elongate channel member and elongate support assembly of the removable cartridge cleaner assembly of FIG. 1 showing the end pin member of the elongate support assembly in engagement with the lower inclined surface of the tapered slot of the opening of the legs of the elongate channel member;

FIG. 8 is an enlarged perspective view of the elongate channel member and elongate support assembly of the removable cartridge cleaner assembly of FIG. 1 showing the end pin member of the elongate support assembly in engagement with horizontal run portion of the opening of the elongate channel member;

FIG. 9 is a perspective view of the elongate rail member of the removable cartridge cleaner assembly of FIG. 1 showing the tapered surface configured to engage the end mounting pin and be urged downwardly toward the upper flat surface of the elongate support assembly;

FIG. 10 is a enlarged side elevational view of one end of the rail member of FIG. 9 showing opening including the tapered portion, the horizontal run portion and the semiannular seat portion;

FIG. 11 is a perspective view of the elongate support assembly of the removable cartridge cleaner assembly of FIG. 1 showing the flat upper surface, the manual securing guide portions, the central lug mount portions, securing block portion and guide wedge portions;

FIG. 12 is a side elevational view of the base channel portion of the elongate support assembly of the removable cartridge cleaner assembly of FIG. 1;

FIG. 13 is an end elevational view of the end mounting pin;

FIG. 14 is an end elevational view of the center mounting pin;

FIG. 18 is an enlarged side elevational view of the removable cartridge cleaner assembly of FIG. 1 showing the central pin member shifting over the tapered upper surface of the manual securing guide portions of the elongate support assembly;

FIG. 19 is an enlarged side elevational view of the removable cartridge cleaner assembly of FIG. 1 showing the offset positioning of the throughbores of the manual securing guide portions and the end flange apertures of the elongate channel member;

FIG. 23 is an enlarged perspective view of the removable cartridge cleaner of FIG. 1 showing a dust guard member of the resilient mount extending from the upper block assembly, between the rail members and along the bracket legs;

FIG. 24 is an enlarged perspective view of the removable cartridge cleaner of FIG. 1 showing a dust guard member of the resilient mount extending from the upper block assembly, between the rail members and along the bracket legs and further showing a ramp member of the resilient mount including an inclined portion having a low friction material connected to the upper surface thereof;

DETAILED DESCRIPTION OF THE PREFERRED EMBODIMENTS

Figure 3A:
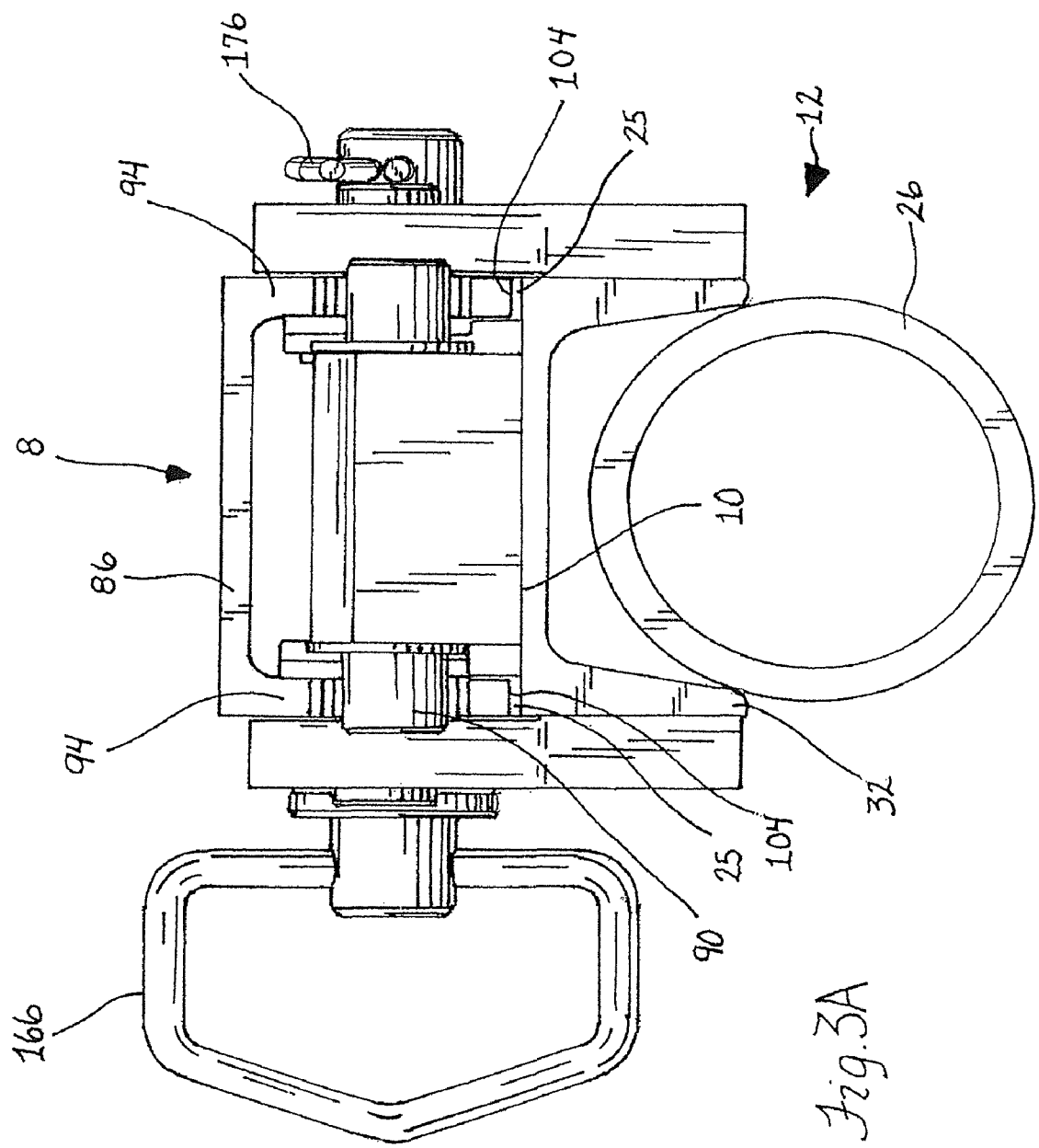
FIG. 3A is an end elevational view of the elongate channel member and elongate support assembly of the removable cartridge cleaner assembly of FIG. 1 showing the low friction member between the upper surface of the elongate support assembly and the lower surfaces of the legs of the elongate rail member.

In FIGS. 1 and 2, a removable cartridge cleaner assembly 2 is shown for a conveyor belt 4 that can be located adjacent the return run 6 or the head pulley of the conveyor belt 4. The removable cartridge cleaner assembly 2 includes a rail or cartridge assembly 8 biased or urged into tight engagement with an upper mounting surface 10 of an elongate support assembly 12 extending in a lateral assembly direction 14 under and across the conveyor belt 4. One or both of the rail assembly 8 and elongate support assembly 12 include biasing or guide surfaces 16 configured to extend generally obliquely to the lateral assembly direction 14 and engage or be engaged by lateral or securing members 18 of the rail and support assemblies 8, 12 configured to extend generally orthogonal to the lateral assembly direction 14 and parallel to the belt travel direction 19. The tight engagement of the rail and support assemblies 8, 12 minimizes vibration and space between the rail and support assemblies 8, 12 thereby reducing or minimizing space available for debris accumulation.

The removable cartridge cleaner assembly 2 is further operable to engage the conveyor belt 4 and minimize damage thereto. For this purpose, the removable cartridge cleaner assembly 2 includes a resilient mount 20 at either end of the elongate support assembly 12. The mounts 20 are configured to bias belt cleaner blades 22 of the rail assembly 8 into engagement with the belt 4 and permit limited vertical movement of the elongate support assembly 12 and rail assembly 8 to both maximize debris removal and minimize damage to the belt 4 and minimize vibration of the removable cartridge cleaner assembly 2. As discussed herein, the removable cartridge cleaner assembly 2 is positioned adjacent the return run 6 of the belt 4, however placement of the removable cartridge cleaner assembly 2 adjacent the pulleys is contemplated.

As is shown in FIGS. 1, 2 and 4-8, a slide interface is defined between the rail assembly 8 and the upper mounting surface 10 of the elongate support assembly 12. In this manner, the rail assembly 8 can be slid along the upper surface 10 of the elongate support assembly 12 as the rail assembly 8 is shifted in the lateral assembly direction 14. The upper surface 10 is configured to minimize friction between the elongate support assembly 12 and the rail member 8 as the rail member 8 travels thereacross. Optionally, as shown in FIG. 3A, the upper surface 10 can include a low friction, quasi-compressible member 25 attached thereto, such as ultra high molecular weight plastic. The low friction member 25 is attached to the upper surface 10 by known means, such as adhesives and bonding.

As can be seen in FIGS. 1 and 2, the elongate support assembly 12 includes an elongate base portion 26 having a longitudinal axis 28 extending below and across the conveyor belt 4 in a lateral assembly direction 14. The elongate support assembly 12 can further include an elongate base reinforcing assembly 30 attached thereto. As shown in FIGS. 2, 11 and 12, the base reinforcing assembly 30 includes a base channel member 32 connected to the elongate base member 26, lower surfaces 34 of flanges or legs 36 of the base channel member 32 being in contact with the base member 26, as shown in FIG. 3. As further shown in FIG. 3, the base portion 26 extends upwardly between the flanges 36 and toward the web 38 of the base channel member 32.

The elongate support assembly 12 further includes an upper mounting surface 10, a pair of manual securing end guide portions 40, a pair of central lug mount or guide portions 42, a securing block portion 44, and a pair of guide wedge portions 46. As shown in FIGS. 11 and 12, the manual securing guide portions 40 and the central lug mount portions 42 are connected to the outer surface 48 of the flanges 36 of the base channel member 32 and extend upwardly away from the base member 26 and above the upper flat surface 10 of the base channel member 32. To accommodate the elongate rail assembly 8 therebetween, the manual securing guide portions 40 and the central lug mount portions 42 can include a step 50, 52 therein along inner faces 54, 56 thereof to ease insertion of the elongate rail assembly 8 therebetween, such as shown in FIGS. 15 and 16.

Figure 15:
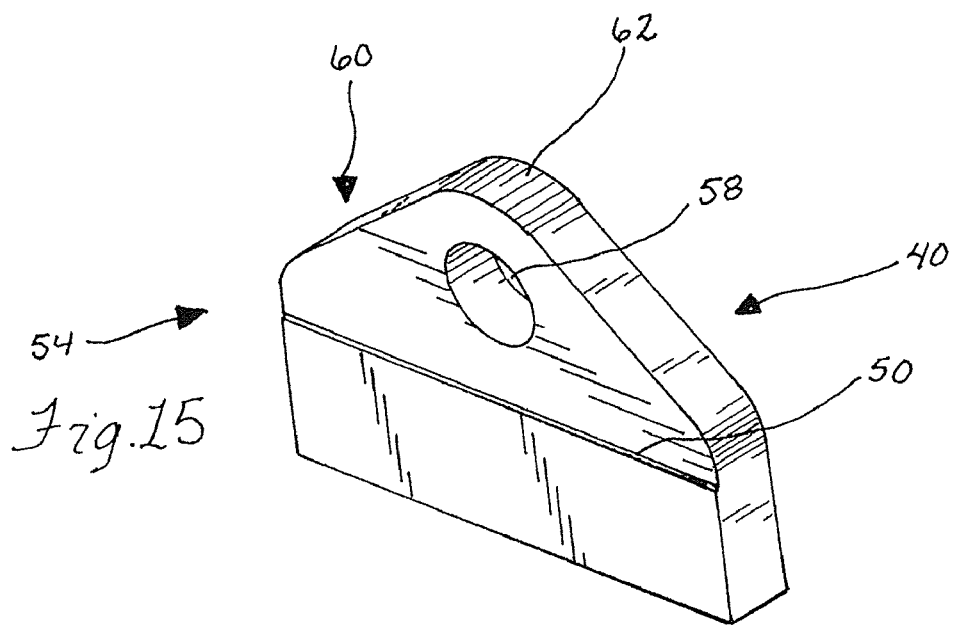
FIG. 15 is a perspective view of the manual securing guide portion of the elongate support assembly of the removable cartridge cleaner assembly of FIG. 1 showing the tapered upper surface thereof.

As shown in FIG. 15, the manual securing guide portions 40 include a throughbore 58 therethrough and a tapered upper surface 60 which extends upwardly to an apex portion 62. As shown in FIG. 18, the tapered upper surface 60 is configured to permit a central pin member 64 to shift therealong, as will be discussed further below.

Figure 16:
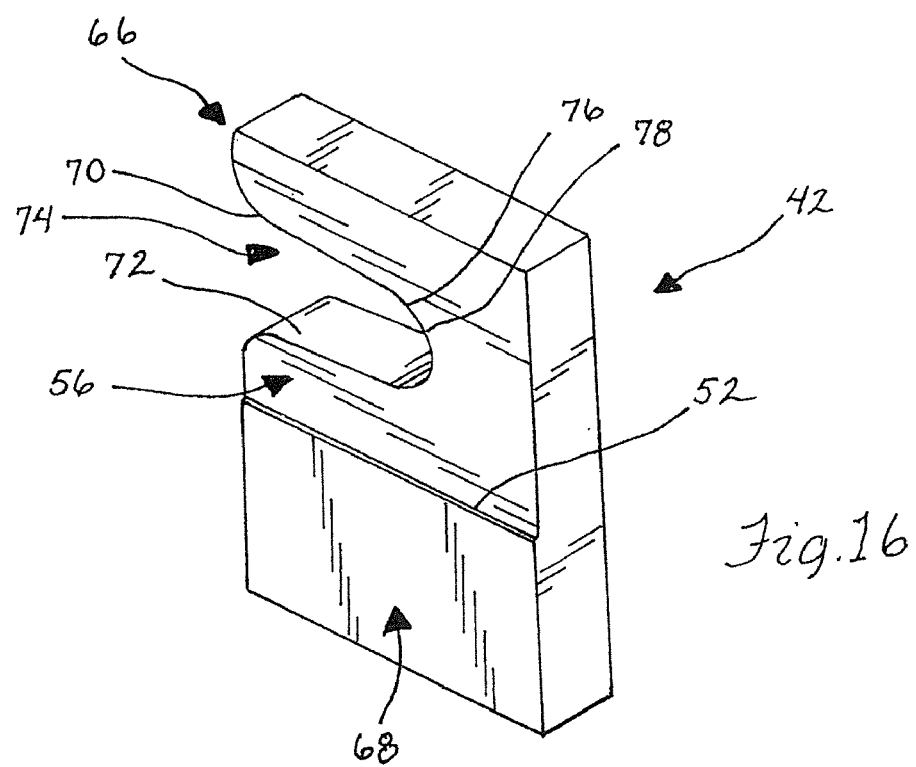
FIG. 16 is a perspective view of the central lug mount portion of the elongate support assembly of the removable cartridge cleaner assembly of FIG. 1 showing the upper inclined surface of the tapered slot configured to engage the center mounting pin and urge the pin downwardly toward the flat upper surface of the elongate support assembly.

The central lug mount portions 42, as shown in FIG. 16 each include a lug portion 66 and a base portion 68, the lug portion 66 and base portion 68 defining upper and lower inclined surfaces or wedge portions 70, 72. The upper and lower inclined surfaces 70, 72 extend obliquely to the longitudinal axis 28 of the elongate support assembly 12 and toward one another to define a tapered slot 74 therebetween. A closed end 76 of the tapered slot 74 comprises a stop portion 78 configured to be engaged by the central pin member 64.

Figure 17:
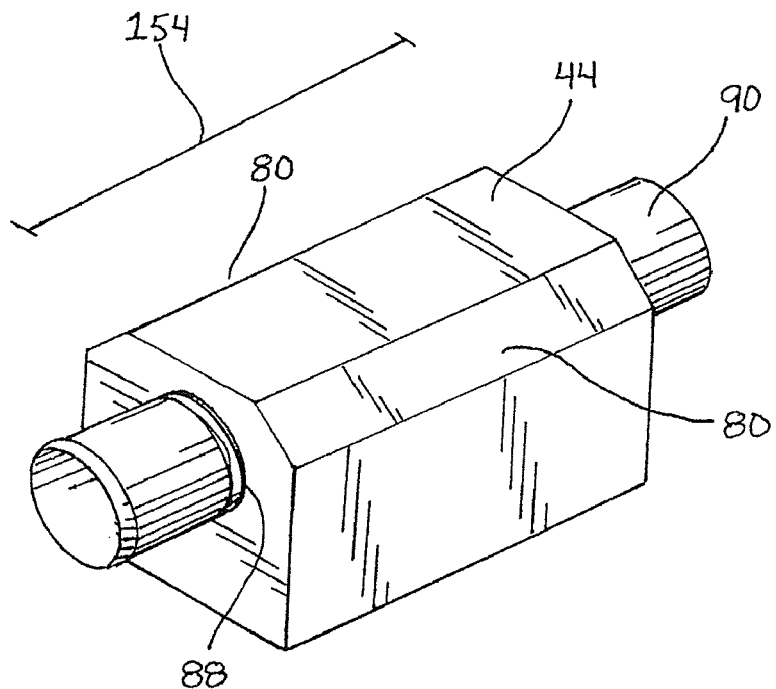
FIG. 17 is a perspective view of the securing block portion and end mounting pin of the elongate support assembly of the removable cartridge cleaner assembly of FIG. 1 showing the end pin member received therein.

The securing block portion 44, as shown in FIG. 17, is positioned on the web portion 38 of the upper flat mounting surface 10 of the base channel member 32. The securing block portion 44 includes chamfered upper edges 80 facing toward either end 82, 84 of the elongate support assembly 12 to ease shifting of the rail member 86 over the securing block portion 44. The securing block portion 44 further includes a throughbore 88 extending in the belt travel direction 19. The throughbore 88 is configured to receive the end pin member 90 as shown in FIGS. 7, 8, 13 and 17 and correspond to the end openings 92 of the legs 94 of the elongate rail assembly 8 as discussed below.

The guide wedge portions 46 as shown in FIGS. 6, 11 and 12 have a trapezoidal configuration 96 with the short parallel side 98 and the long parallel side 100 extending in the belt travel direction 19 and the angled sides 104 extending between the shorter and longer parallel sides 98, 100. The short parallel side 98 is positioned to face toward the manual securing guide portions 40 to help guide the legs 94 of the rail member 86 there around.

The elongate rail or cartridge assembly 8, as shown in FIGS. 1 and 2, includes belt cleaner blade assemblies 22, an elongate rail or cartridge member 86, and a central pin member 64. The pin member can be preassembled with the rail member, or can be a serviceable item. The elongate rail member 86 is configured to extend along and below the width of the belt 4 such that the belt cleaner blade assemblies 22 are engaged along the width of the belt 4. As shown in FIG. 9, the rail member 86 is a C-channel member including a web portion 102 and a pair of flanges or legs 94 extending parallel to one another, the lower surfaces 104 thereof configured to slide along the upper mounting surface 10 of the elongate support assembly 12. As shown in FIG. 9, the legs 94 are configured to be thin in profile to minimize contact area between the legs 94 and the elongate support assembly 12. The belt cleaner blade assemblies 22 can include known scraper blades, biasing mechanisms, and other known assemblies used in belt cleaning assemblies.

Further, as shown in FIG. 9, the web portion 102 of the rail member 86 includes a series of apertures therein along the length 106 thereof. In particular, the web portion 102 includes a pair of removal apertures 108 located adjacent either end 110, 112 of the rail member 86. Further, the web portion 102 includes a series of smaller, blade mounting apertures 114 for mounting the cleaner blades assemblies 22 to the rail member 86.

The flanges 94 each include three apertures 116, 118 therein, the apertures generally located at a central location vertically on the flange 94 and generally corresponding to the throughbore of the securing block portion 44, the tapered slot 74 of the central lug mount portions 42 and the throughbores 58 of the manual securing guide portions 40. A central aperture 116 is located generally centrally along the length 106 of the flange 94. The end apertures 118 are located generally adjacent the ends 110, 112 of the flanges 94.

In addition, both flanges 94, at either end 110, 112 thereof, include an opening 92 therein as best shown in FIGS. 7 and 8. The opening 92 is positioned generally centrally vertically along the flanges 94 of the rail member 86 and extends from the end 110, 112 of each flange 94 toward the end apertures 118 of the flange 94. The opening 92 includes horizontal run portions 120 extending from a semiannular seat portion 122 thereof to the tapered slot portion 124 having upper and lower inclined surface portions 126, 128 extending obliquely to the longitudinal axis 28 of the elongate support assembly 12 and to the end 110, 112 of the flange 94.

The rail member 86 is guided along the upper flat surface 10 of the elongate support assembly 12 by the manual securing guide portions 40 and the central lug mount portions 42 adjacent the outer face 130 of the depending legs 94 of the rail member 86, and by guide wedge portions 46 adjacent the inner face 132 of the depending legs 94 of the rail member 86. Both the manual securing guide portions 40 and the central lug mount portions 42 are spaced so as to receive the rail member 86 therebetween. The guide wedge portions 46, as shown in FIG. 6, are configured to be received between the flanges 94 of the rail member 86, the tapered sides 101 configured to guide the rail member 86 along the desired path on the upper flat surface 10 of the elongate support assembly 12. As shown in FIG. 11, the guide wedge portions 46 are positioned adjacent the central lug mount portions 42 and the securing block portion 44 so as to guide the rail member 86 to the appropriate orientation as the rail member 86 is shifted toward the central lug mount portions 42 and the securing block portion 44.

The orientation and design of the manual securing guide portions 40, central lug mount portions 42, and securing block portion 44 are such as to allow the a first end 110 of the rail member 86 to be positioned adjacent the manual securing guide portions 40 and slid along the length of the base channel member to the operable position 134. The tapered upper edge 60 of the manual securing guide portions 40 are configured to ease travel of the central pin member 64, which extends outwardly from the flanges 94 of the rail member 86, over the manual securing guide portions 40 as shown in FIG. 18.

As shown in FIGS. 1, 4 and 5, the tapered slots 74 of the central lug mount portions 42 are configured to face toward the manual securing guide portions 40, therefore allowing the central pin member 64 to be received therein as the rail member 86 moves in a lateral assembly direction 14. Additionally, the tapered slots 124 at the ends 110, 112 of the depending legs 94 of the rail member 86 are configured to receive the end pin member 90 extending from the securing block portion 44 therein, with the securing block portion 44 disposed between the web portion 102 and the depending legs 94 of the rail member 86 and the upper mounting surface 10 of the elongate support assembly 12.

The inclined surfaces 70, 72, or wedge portions, defining the tapered slots 74 of the central lug mount portions 42 and the flanges 94 at either end 110, 112 of the rail member 86 are configured to engage and/or be engaged by the corresponding pin member 64, 90. The biasing surfaces 16 are in the form of the upper inclined surfaces 70 of the central lug mount portions 42 which are configured to be engaged by the central pin member 64 of the elongate rail assembly 8, and, as the rail member 86 is shifted along the upper mounting surface 10 of the elongate support assembly 12, urge the central pin member 64 and rail member 86 downwardly toward the upper flat surface 10 of the elongate support assembly 12. The central pin member 64 is shifted along the upper inclined surface 70 until central pin 64 engages the stop portion 78 of the tapered slot 74. The engagement of the central pin member 64 and the stop portion 78 of the tapered slot 74 restricts movement of the central pin 64 in the vertical direction and in the horizontal lateral assembly direction 14.

In contrast, as shown in FIGS. 7, 9 and 10 the lower inclined surfaces or wedges 128 of the openings 92 of the flanges 94 of the rail member 86 are configured to engage the end pin member 90. As the rail member 86 shifts across the upper flat mounting surface 10 of the elongate support assembly 12, the lower inclined surfaces 128 of the rail member 86 flanges further engage the end pin member 90 and urge the rail member 86 toward the upper flat surface 10 of the elongate support assembly 12. The end pin member 90 further travels along the lower inclined surface 128 to the horizontal run portions 120 of the opening 92. The horizontal run portion 120 is configured to restrict further vertical movement of the rail member 86 relative to the end pin member and includes a semiannular seat portion 122 at the end thereof. As a result, the rail member 86 is shifted into tight engagement with the upper flat surface 10 of the elongate support assembly 12, thereby minimizing any space or gaps at the interface between the lower surface of the flanges 94 of the rail member 86 and the upper flat surface 10 of the elongate support assembly 12.

The openings 92 of the flanges 94 are configured so that the end pin member 90 may or may not shift along the horizontal run portions 120 to the semiannular seat portion 122 or stop portion of the opening 92. The horizontal run portion 120 is configured so that the end pin member 90 does not necessarily engage the semiannular portion 122. While the distance 136 between the flange openings 92 and the central pin member 64 should be generally equal to the distance 138 between the end pin member 90 and the stop portion of the tapered slots 74 of the central lug mount portions 42, the configuration of the horizontal run portion 120 provides a degree of tolerance when new or different rail members 86 with a distance different from the elongate support assembly 12 distance is installed on the same elongate support assembly 12. As a result, movement of the rail member 86 in the lateral assembly direction 14 may be impeded solely by the engagement of central pin member 64 and the central lug mount portions 42.

As shown in FIGS. 13 and 14, the end pin member 90 and the central pin member 64 each have a predetermined length 140, an annular outer surface 142, chamfered ends 144, and a predetermined number of grooves 146, 148, 150 positioned along the length 140, 141 of the pin members 64, 90 and around the annular outer surface 142 thereof. The grooves 146, 148, 150 are configured to receive a securing member 152 therein, such as a clip as shown in FIG. 6. With regards to the end pin member 90 shown in FIG. 13, the grooves 146 are spaced a first distance 151 corresponding to the width 154 of the securing block portion 44. Therefore, when the end pin member 90 is installed in the throughbore 88 of the securing block portion 44, and securing members 152 are inserted into the grooves 146, the end pin member 90 is securely disposed in the securing block portion 44.

With regards to the central pin member 64, as shown in FIG. 14, the central pin member 64 includes a pair of outer grooves 148 and a pair of inner grooves 150. The two outer grooves 148 are separated a distance 160 equal to the distance 162 between the inner surfaces 132 of the flanges of the rail member 86. Thus, when the central pin member 64 is inserted into the central aperture 116 of the flanges of the rail member 86, and the securing members 152 are installed in the grooves 148, the central pin member 64 is securely fastened to the rail member 86.

In order to provide additional support to the rail member 86 and central pin member 64, a reinforcing member (not shown) can be installed along the inner face 132 of the flanges 94. The reinforcing member is positioned so as to overlap with the central flange aperture 116 and extend toward each flange end 110, 112. The reinforcing member includes a throughbore corresponding to the flange central aperture 116 and configured to receive the central pin member 64 therein. Further, to accommodate the reinforcing member, the outer and inner grooves 148, 150 of the central pin member 64 are separated by a distance (not shown) corresponding to the width of the reinforcing member. After securing member 152 are positioned in the inner grooves 150 thus further securing the central pin member 64 in place. The reinforcing member is preferably made of a strong material, such as aluminum or stainless steel, and provides additional strength to the rail member 86 around the central pin member 64.

The rail member 86 is further positively secured in place by a hitch pin 164. As shown in FIG. 3, the hitch pin 164 includes an oversized head portion 166 and a shaft portion 168 configured to extend through the throughbores 58 of the manual securing guide portions 40 and through the end apertures 118 of the flanges 94 of the rail member 86. The shaft 168 of the hitch pin 164 further includes a throughbore 170 extending across the diameter 172 of the shaft 168 adjacent a distal end 174 thereof. The hitch pin 164 is secured in place by a cotter pin 176 configured to be received in the throughbore 170 of the hitch pin 164 and extend therethrough.

As shown in FIG. 19, the throughbores 58 of the manual securing guide portions 40 and the apertures 118 of the flanges 94 are offset from one another and oversized with respect to the shaft 168 of the hitch pin 164. As a result, when the shaft 168 of the hitch pin 164 is used to positively secure the rail member 86 to the elongate support assembly 12, a bottom portion 178 of the hitch pin shaft 168 engages a bottom portion 180 of the flange apertures 118. Additionally, a top portion 182 of the hitch pin shaft 168 engages a top surface portion 184 of the throughbores 58 of the manual securing guide portions 40. As a result, a tighter fit with less friction during installation and removal is achieved because the hitch pin 164 is only engaged along the upper and lower surface portions 178, 182 thereof instead of along the entire annular outer surface 186 of the hitch pin shaft 168.

Figure 26:
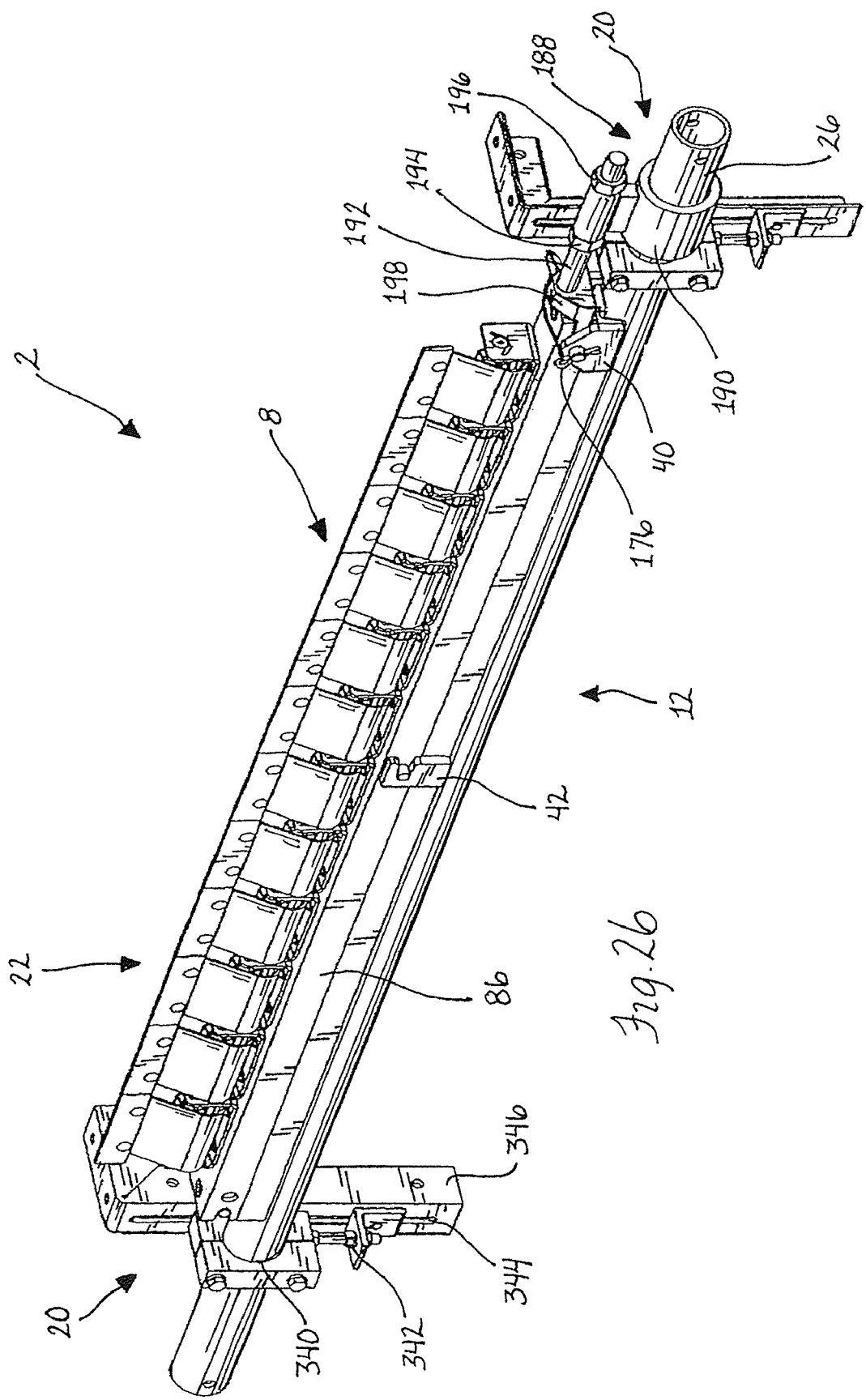
FIG. 26 is a perspective view of an alternative embodiment of the removable cartridge cleaner assembly of FIG. 1 showing an alternative resilient mount and an end securing mechanism for further manually securing the elongate channel member on the elongate support assembly.
Figure 27:
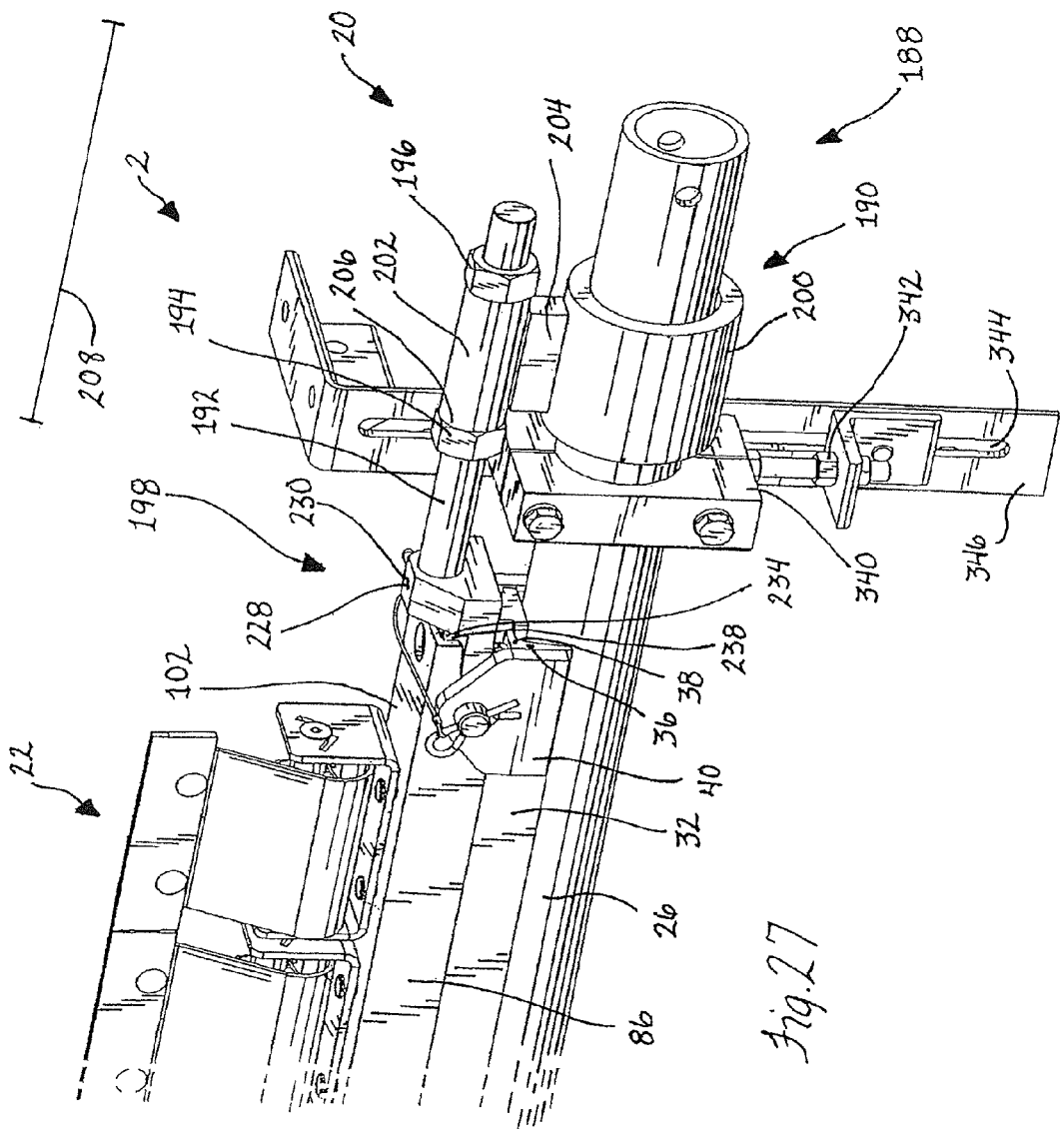
FIG. 27 is an enlarged perspective view of the removable cartridge cleaner assembly of FIG. 26 showing the resilient mount and end securing mechanism.

In one embodiment, the rail member 86 is further secured to the elongate support assembly 12 via an end securing mechanism 188. As shown in FIGS. 26 and 27, the end securing mechanism 188 includes a tubular sleeve member 190, a pole member 192, a pair of guide nut members 194, 196 and an end locking member 198. The sleeve member 190 includes a large tubular sleeve portion 200 configured to receive the base member 26 of the elongate support assembly 12 therethrough and a small tubular sleeve portion 202 configured to receive the pole member 192 therethrough. The large and small sleeve portions 200, 202 are separated and connected via a block portion 204 sized to position the small sleeve portion 202 at a desired location in relation to the rail member 86. The large sleeve portion 200 is configured to have a running fit with the base member 26 of the elongate support assembly 12 to permit installation and removal of the large sleeve portion 200. The large sleeve portion 200 can be positively secured (not shown) to the base member 26, such as by a bolt or other known means. The small sleeve portion 202 is configured to have an inner diameter 206 sized larger than the pole member 192 as will be discussed below.

Figure 29:
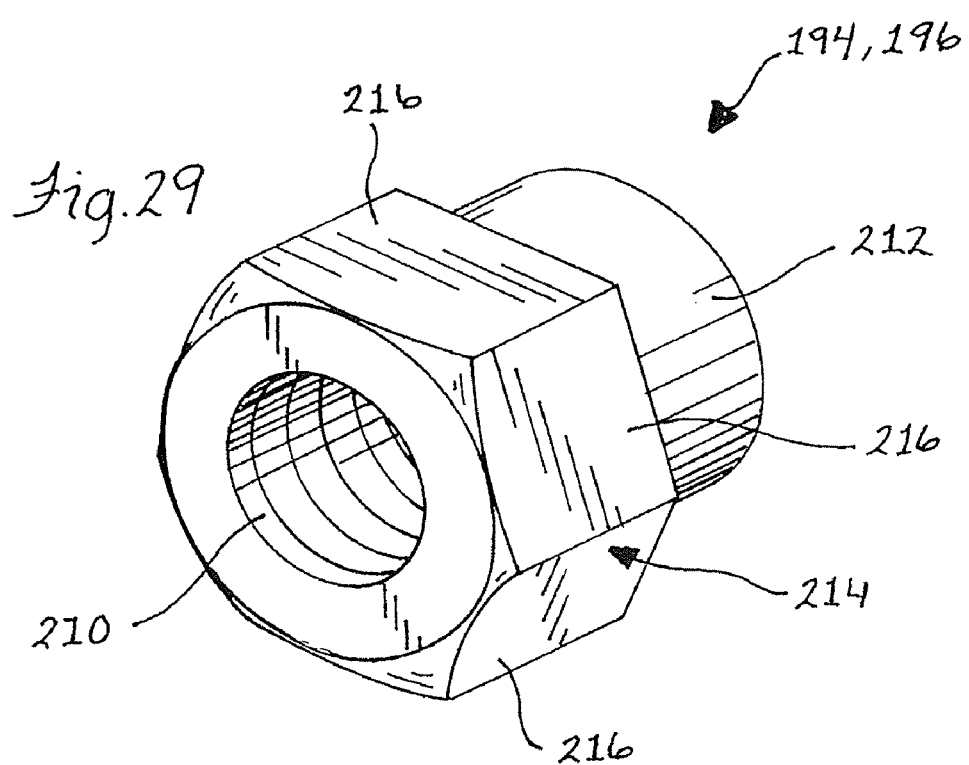
FIG. 29 is a perspective view of a guide nut member of the end securing mechanism of FIG. 26 showing the threaded interior surface, the annular outer surface portion and the engagable outer surface portion.

The pole member 192 is threaded along its length 208 and is configured to extend from the end locking member 198, through the small sleeve 202 and beyond. The guide nut members 194, 196, as shown in FIGS. 27 and 29, each include a threaded inner surface 210 configured to interact with and receive the threaded pole member 192 therein. The guide nut members 194, 196 each include an annular outer surface portion 212 sized to be received in the small sleeve portion 202 of the sleeve member 190. Further, the guide nut members 194, 196 each include an engagable outer surface portion 214 sized larger than the small sleeve portion 202 of the sleeve member 190 and configured to be engaged to shift the guide nut 194, 196 along the threaded pole member 192. As shown in FIG. 29, the engagable outer surface portion 214 comprises six flat surfaces 216, and more particularly, three sets of parallel flat surfaces.

Figure 28:
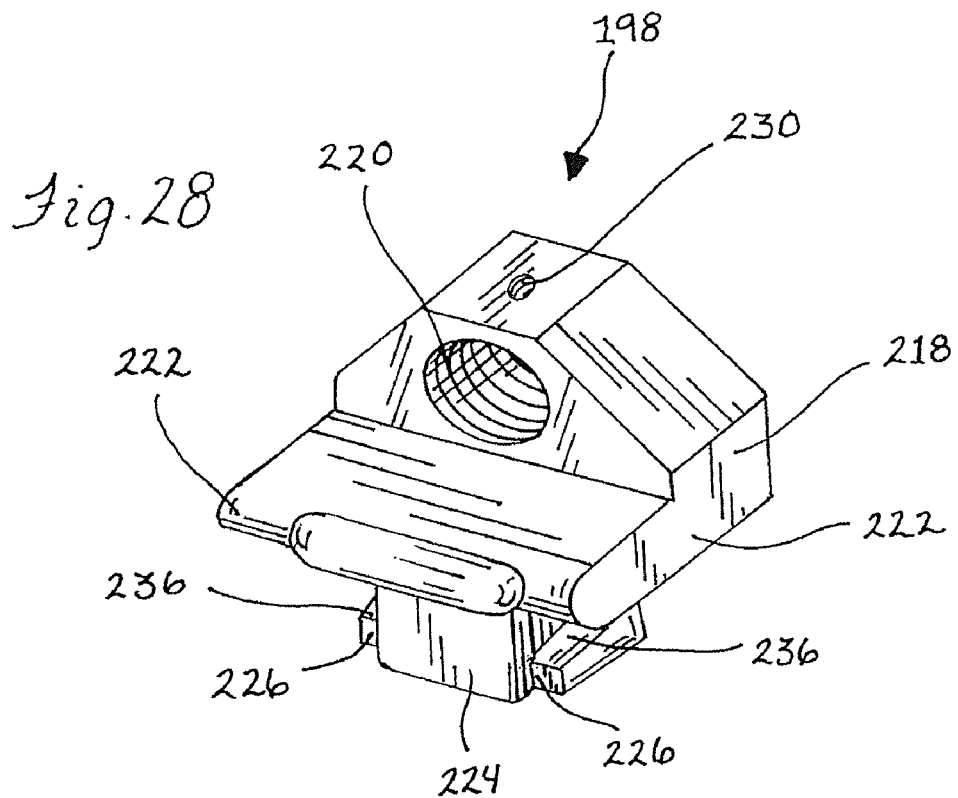
FIG. 28 is a perspective view of the end locking member of the end securing mechanism of FIG. 26 showing the wedge portions and depending wedge portions.

The end locking member 198, as shown in FIGS. 27 and 28, is configured to engage the base channel member 32 of the elongate support assembly 12 and the rail member 86, and urge the base channel member 32 and the rail member 86 toward one another. In particular, the end locking member 198 includes a base portion 218, a threaded pole throughbore 220 configured to receive the threaded pole member 192 therein, upper wedge portions 222 configured to be received in the openings 92 of the rail member 86, a depending portion 224, and depending wedge portions 226. The threaded pole member 192 can further be secured to the end locking member 198 by a set screw 228 extending through a threaded set screw throughbore 230 as shown in FIG. 27. The threaded set screw throughbore 230 is configured to transversely intersect the threaded pole throughbore 220.

To accommodate the depending portion 224, the web portion 38 of the base channel member 32 includes a corresponding open ended slot (not shown) formed at the end 234 thereof. The depending portion 224 is configured to be received in and extend through the slot 232 and be received between the legs 36 of the base channel member 32. The depending wedge portions 226 are configured so that inclined upper surfaces 236 thereof engage the lower surface 238 of the web portion 38 of the base channel member 32. As the inclined upper surfaces 236 of the depending wedge portions 226 travel along the lower surface 238 of the web portion 38 the entire end locking member 198 is urged downwardly toward the base member 26 of the elongate support assembly 12. As a result, the rail member 86, which is engaged with the upper wedge portions 226, is further urged into tight engagement with the upper mounting surface 10 of the elongate support assembly 12.

To secure the position of the end locking member 198, a first guide nut member 194 and a second guide nut member 196 are positioned on the threaded pole member 192, with the first guide nut member 194 positioned between the small sleeve portion 202 and the end locking member 198 and the second guide nut member 196 positioned on the opposite side of the small sleeve portion 202, the annular outer surfaces 212 thereof received in the small sleeve portion 202 of the sleeve member 190.

The threaded pole member 192 and end locking member 198 can be shifted away from the rail member 86 by adjusting the first guide nut member 194 away from the small sleeve portion 202 of the sleeve member 190 and toward the end locking member 198. As a result, the pole member 192 can be shifted away from the rail member 86 until the small annular surface 212 of the first guide nut member 194 is received in the small sleeve portion 202 of the sleeve member 190. The second guide nut member 196 can then be subsequently shifted along the threaded pole member 192 toward the small sleeve portion 202 to secure the small sleeve portion 202 between the first and second guide nut members 194, 196.

Alternatively, the threaded pole member 192 and end locking member 198 can be shifted toward the rail member 86 by adjusting the second guide nut member 196 away from the small sleeve portion 202 of the sleeve member 190. As a result, the pole member 192 can be shifted toward the rail member 86 until the small annular surface 212 of the second guide nut member 196 is received in the small sleeve portion 202 of the sleeve member 190. The first guide nut member 194 can then be subsequently shifted along the threaded pole member 192 toward the small sleeve portion 202 to secure the small sleeve portion 202 between the first and second guide nut members 194, 196.

As shown in FIGS. 1 and 2, a resilient mount 20 is positioned adjacent either end 82, 84 of the elongate support assembly 12. As shown in FIG. 1, the resilient mount 20 adjacent to the securing block portion 44 of the elongate support assembly 12 can be any known resilient mount 20, such as a spring tensioner.

Figure 20:
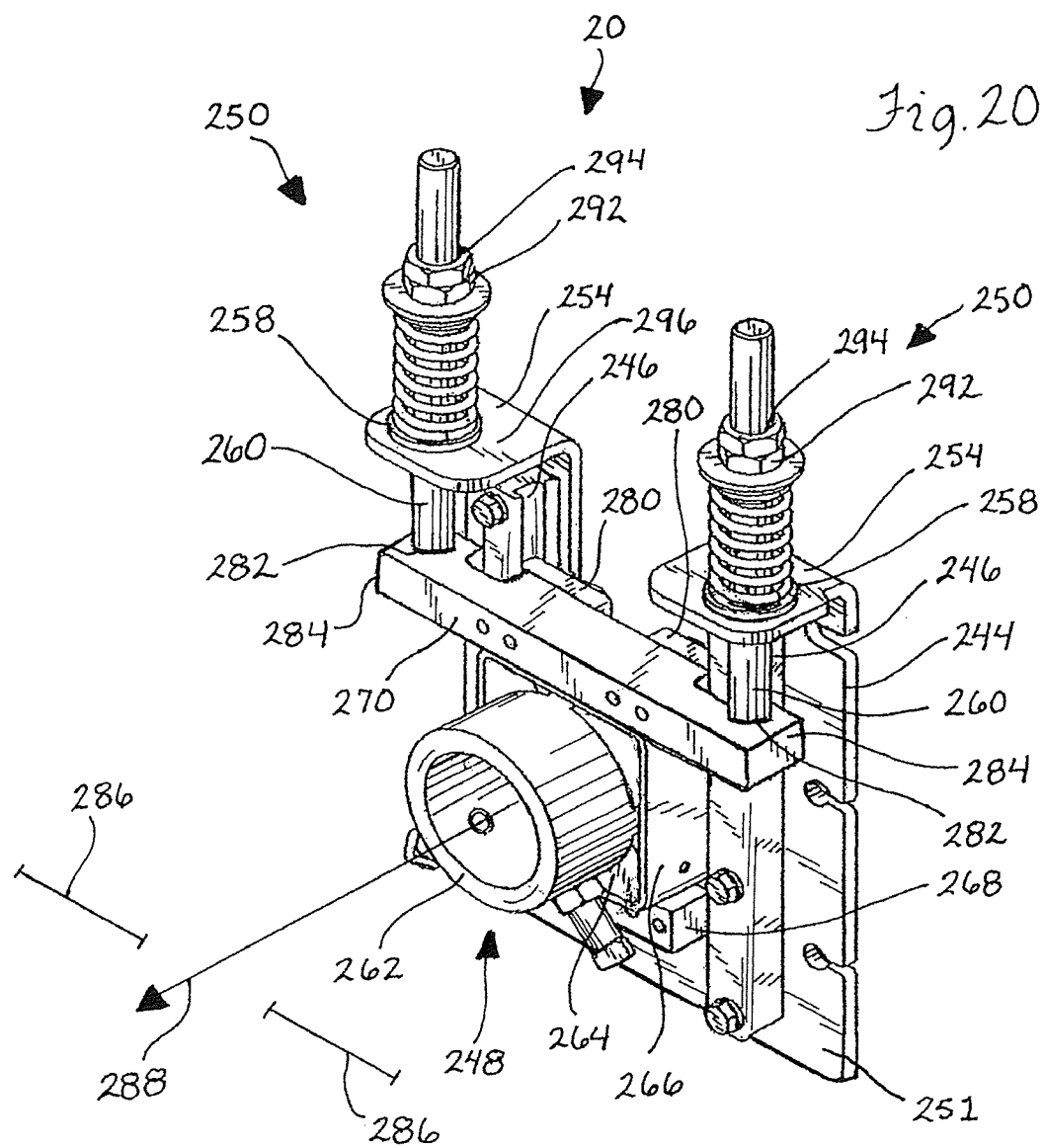
FIG. 20 is a perspective view of the resilient mount of the removable cartridge cleaner assembly of FIG. 1 showing two spaced resilient mechanisms and a U-shaped bracket.
Figure 21:
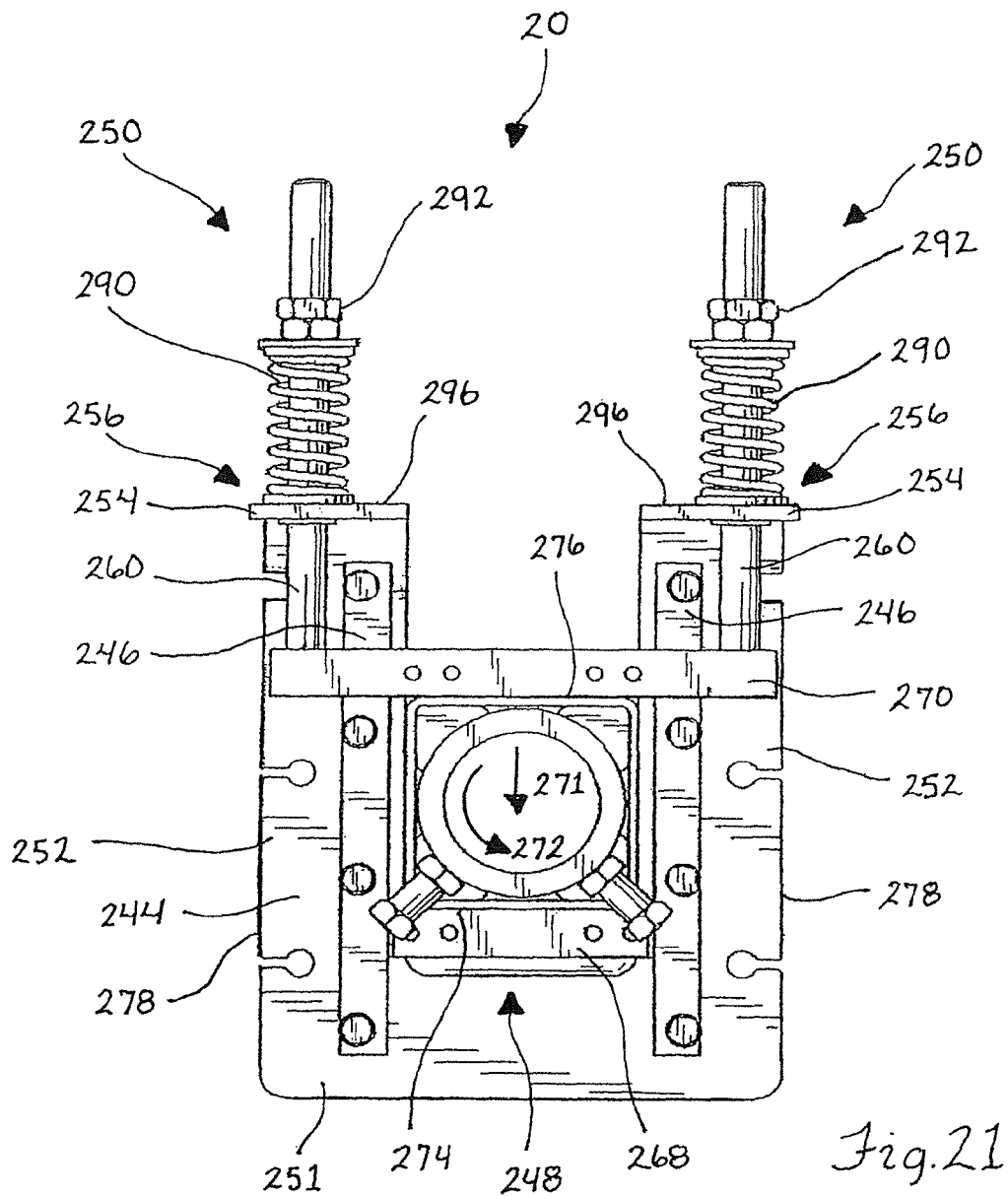
FIG. 21 is an end elevational view of the resilient mount of FIG. 20.

The resilient mount 20 adjacent the manual securing guide portions 40 of the elongate support assembly 12 is configured to permit shifting of the rail member 86 off of the flat upper surface 10 of the elongate support and assembly and out from under the conveyor belt 4. As shown in FIGS. 1, 20 and 21, the resilient mount 20 includes a U-shaped bracket 244, track members 246, a housing assembly 248 configured to travel along the track members 246 of the bracket 244, and resilient mechanisms 250 configured to resist vertical movement of the housing assembly 248. The U-shaped bracket 244 includes a base portion 251 and spaced leg portions 252 extending upwardly therefrom, with a shelf 254 extending transversely from the distal ends 256 of the legs portions 252. As shown in FIG. 20, the shelf 254 includes a leg mounting portion 258, such as an aperture therein configured to receive a threaded pole member 260 of the resilient mechanism 250 therein. The legs 252 are further configured to define a space therebetween to permit the rail member 86 to pass therethrough.

The housing assembly 248 includes a pole receiving portion 262, resilient portions 264, an inner housing portion 266, and lower and upper block assemblies 268, 270. The pole receiving portion 262 is configured to receive the elongate support member 12 therein, and is positioned within the inner housing portion 266. As a result, the inner housing portion 266, and thereby the housing assembly 248, receives vertical and rotational forces 271, 272 applied to the pole receiving portion 262 by the elongate support assembly 12. As shown in FIG. 20, the resilient portions 264 are positioned between the pole receiving portion 262 and the inner housing portion 266.

As shown in FIGS. 20 and 21, the lower block assembly 268 is secured to the lower outer surface 274 of the inner housing portion 266 and extends between the track members 246 of the bracket 244. The lower block assembly 268 further includes guide blocks (not shown) configured to engage the track members 246 and slide therealong.

The upper block assembly 270 is secured to the upper outer surface 276 of the inner housing portion 266 and extends from either outer vertical edge 278 of the bracket 244. The upper block assembly 270 includes upper guide blocks 280 configured to engage the track members 246 and slide therealong. As shown in FIG. 20, the upper block assembly 270 further includes mounting portions 282, such as threaded throughbores adjacent either end 284 thereof configured to receive a threaded rod 260 of the resilient mechanisms 250 therein. As shown in FIGS. 20 and 21, the threaded throughbores 282 are offset a predetermined distance 286 from an axis 288 defined by the base member 26 extending through the pole receiving portion 262 of the housing assembly 248.

As shown in FIGS. 1, 2, 20 and 21, the resilient mechanism 250 includes a threaded pole member 260, a resilient member 290, such as a spring, and a securing member 292, such as a nut having a threaded interior surface 294. As shown in FIG. 20, the threaded pole member 260 is received in the throughbores 282 of the upper block assembly 270 and extends upwardly therefrom. The threaded pole member 260 further extends through and beyond the shelf aperture 258 of the bracket 244. The resilient member 290 is positioned on the upper surface of the shelf 296, with the securing members 292 positioned on the threaded rod 260 adjacent the resilient member 290.

As discussed above, the housing assembly 248 is configured to receive vertical forces 271 and rotational forces 272 from an elongate member 26 received in the pole receiving portion 262, such as the elongate support assembly 12. Vertical forces 271 applied to the housing assembly 248 are resisted by the resilient mechanisms 250 as discussed above.

Rotational forces 272, however, are resisted by the engagement of the upper and lower block assemblies 268, 270 with the track portions 246 and the engagement of the resilient mechanism 250 with the leg mounting portion 258 or shelf aperture of the bracket 244. By positioning the mounting portion 282 away from the housing assembly 248, such as adjacent either end 284 of the upper housing block 270, the force acting thereon is reduced. As a result the frictional forces between the resilient mechanisms 250 as it engages the inner surfaces (not shown) of the shelf apertures 258 is further reduced, thereby reducing wear and providing smoother vertical travel of the housing assembly 248.

In some instances, such as shown in FIG. 24, the flat upper mounting surface 10 of the elongate support assembly 12 may be lower than the upper surface 302 of the upper block assembly 270 of the resilient mount 20. To ease removal of the rail member 86, the resilient mount 20 can include a ramp member 304 connected thereto. The ramp member 304 includes a horizontal portion 306 and an inclined portion 308 extending obliquely therefrom and toward the base member 26 of the elongate support assembly 12. The horizontal portion 306 is positively secured to the upper surface 302 of the housing assembly 248 of the resilient mount 20.

The inclined portion 308 extends downwardly toward the base member 26 a distance 310 such that the distal end 312 of the inclined portion 308 is positioned below the flat upper mounting surface 10 of the elongate support member 12. As shown in FIG. 24, the inclined portion 308 can include a low friction member 314, made of a material such as UHMW, positively secured, such as by carriage bolts, to the upper surface thereof 316. The low friction member 314 provides a low friction surface 318 for legs 94 of the rail member 86 to slide along the inclined portion 308. In this manner, the inclined portion 308 is configured to allow the legs 94 of the rail member 86 to slide off of the flat upper surface 10 of the elongate support member 12 and onto the upper surface 318 of the low friction member 314 of the inclined portion 308 and travel upwardly between the legs 252 of the mounting bracket 244 and away from the elongate support assembly 12. As shown, the horizontal portion 306 of the ramp portion 304 is connected to the upper block assembly 270 by a pair of bolts 320 positioned so that as the rail member 86 slides thereacross the bolts 320 are positioned below the web portion 102 and between the flanges 94 the rail member 86.

In one embodiment, as shown in FIGS. 23 and 24, the resilient mounts 20 include dust guard members 322. The dust guard members 322 are mounted to the back face 324 of the housing assembly 248 of a resilient mount 20. As shown in FIGS. 23 and 24, the dust guard members 322 are configured to extend from the upper block assembly 270 of the housing assembly 248 and along and beyond the back face 324 of the housing assembly 248. As shown, the dust guard members 322 include a pole aperture 326 to accommodate the base member 26 of the elongate support assembly 12 and fastener apertures 328 to accommodate the fasteners 330 of the lower block assembly 268 of the housing assembly 248.

Figure 22:
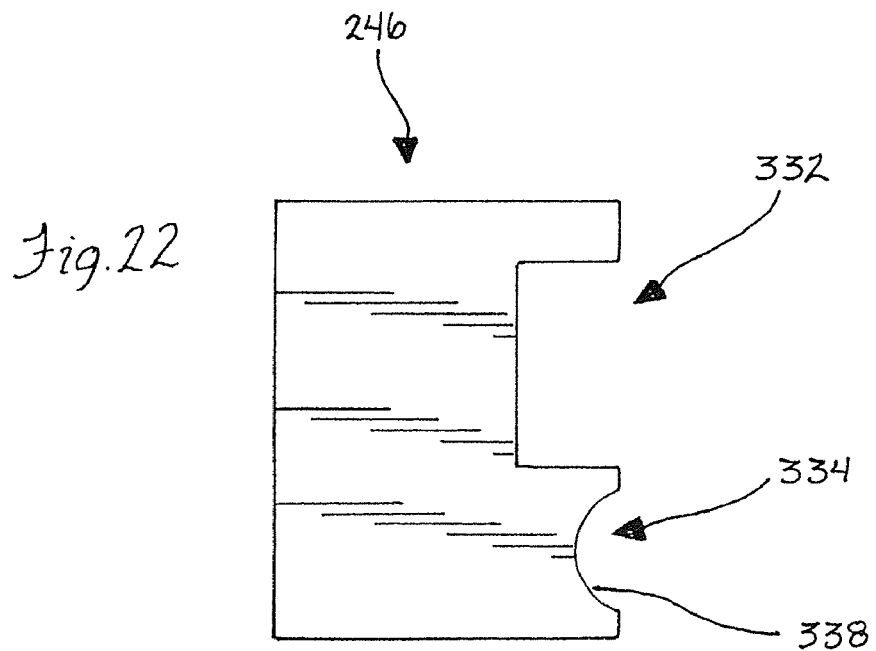
FIG. 22 is a top plan view of the trail rail member of a resilient mount showing a squared track portion and a semiannular track portion.

As described above, the resilient mounts 20 each include a bracket 244 having a base portion 251 and a pair of spaced legs 252. Further, the resilient mount 20 includes a pair of track members 246 mounted on each of the legs 252. As shown in FIG. 22, the guide track members 246 include rail track portions 332, 334 for mounting the housing assembly 248 and dust guard member 322 thereto. The track portions 246 are further configured to enable the housing assembly 248 and dust guard member 322 to shift along the legs 252 of the bracket 244.

In particular, the track portions 246 include a first, square-shaped track 332 configured to receive the upper and lower block assemblies 268, 270 of the housing assembly 248 and allow the block assemblies 268, 270 to translate therealong. Additionally, the guide tracks 246 include a second track 334 to receive cover portions 336 of the dust guard members 322 therein. As shown in FIG. 22, the second track 334 has a rounded or semiannular configuration 338.

The second track 334 and the dust guard members 322 are configured to permit the dust guards members 322 to translate therealong and restrict dust from moving between the legs 252 of the mounting bracket 244 of the resilient mount 20. Further, the dust guard 322 acts to restrict dust and material interaction with the resilient rubber portions 264 of the housing assembly 248, thereby reducing wear on the resilient rubber portions 264. Additionally, a slide interface between the cover portion 336 and the second track 334 restricts debris movement through the bracket legs 252 and debris accumulation in the track portions 246, particularly the first track 332 along which the housing assembly 248 shifts, thereby providing a smoother slide interface and allowing freer movement of the housing assembly 248 along the tracks 246.

The dust guard members 322 can be composed of any material suitable for the application. In one embodiment, the dust guard members 322 are made of a deformable plastic and are configured to have square edges. Over time, the square edges deform with the rounded or semiannular track 334 to provide a smooth running interface.

Other mounts 20 can be utilized with the removable cartridge cleaner assembly 2, so long as the mounts 20 permit removal of the rail member 86 with the cleaner blades 22 attached thereto. An alternative mount 20, as shown in FIGS. 26 and 27, includes a clamp block 340 configured to receive the base member 26 of the elongate support member 12 therein. The clamp block 340 is supported from below by a threaded member 342, such a bolt. The clamp block 340 is configured to be received in a vertical slot 344 of a support member 346 and shifted therealong.

Figure 25:
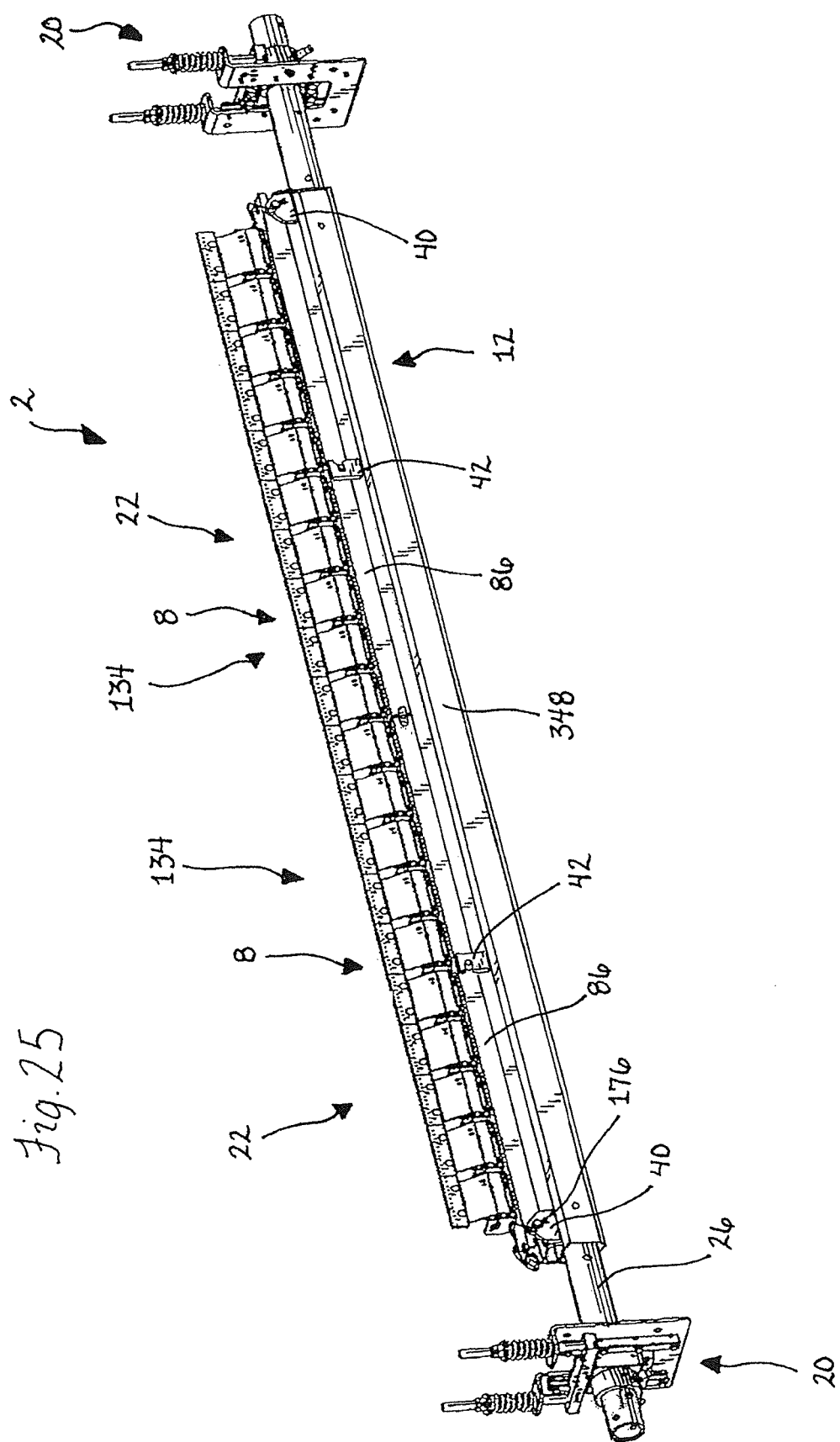
FIG. 25 is a perspective view of an alternative embodiment of the removable cartridge cleaner assembly of FIG. 1 showing a pair of rail members having scraper blades mounted thereon extending a central portion of the elongate support assembly toward either end thereof.

In an alternative embodiment, as shown in FIG. 25, the removable cartridge cleaner assembly 2 may include a pair of rail members 86 mounted on the elongate support assembly 12. As shown in FIG. 25, the elongate support assembly 12 includes a reinforcing portion 30, such as a rectangular tube, extending along a portion of the length of the base member 26. As shown, the reinforcing portion 30 also corresponds to the base channel member 32 of the elongate support assembly 12 discussed above. The reinforcing portion 30 provides additional strength to the elongate support assembly 12 for wider belts, such as belts wider than 72".

To accommodate two rail members 86, each rail member 86 extends from a generally central portion 348 of the elongate support assembly 12 toward either end thereof 82, 84, the elongate support assembly 12 including a pair of securing block portions 44 located at a generally central portion 348 of the elongate support assembly 12, two pairs of central lug mount portions 42, and two pairs of manual securing guide portions 40 located adjacent either end 82, 84 of the elongate support assembly 12. In this embodiment, the rail members 86 are installed from either end 82, 84 of the elongate support assembly 12 and are shifted along the flat upper surface 10 of the reinforcing portion 30 of the elongate support assembly 12 toward an operative position 134 wherein one end of each of the rail members 86 is positioned at a generally central location 348 of the elongate support assembly 12.

A method of installing and removing the rail member 86 having cleaning blade assemblies 22 mounted thereon is discussed herein. To install a rail member 86, a first end 110 of the rail member 86, with cleaning blade assemblies 22 mounted thereon, is positioned adjacent the resilient mount 20 nearest the manual securing portions 40. The first end 110 of the rail member 86 is shifted between the upstanding legs 252 of the resilient mount 20 toward the flat mounting surface 10 of the elongate support assembly 12.

As the first end 110 of the rail member 86 is shifted between the upstanding legs 252 of the resilient mount 20 in the lateral assembly direction 14, the distal ends 104 of the flanges 94 of the rail member 86 are positioned on the flat upper surface 10 of the elongate support assembly 12. The rail member 86 is shifted along the flat upper surface 10 of the elongate support assembly 12 until the central pin member 64 engages the tapered upper surface 60 of the manual securing guide portions 40. As the rail member 86 is further shifted in the lateral assembly direction 14 the central pin member 64 shifts along the tapered upper surface 60 of the manual securing guide portions 40, over the apex 62 and down toward the flat upper surface 10.

The rail member 86 is further shifted until the central pin member 64 engages the upper inclined surfaces 70 of the central lug mount portions 42 and the lower inclined surfaces 128 of the tapered slots 124 of the legs of the rail member 86 engages the end pin member 90. The rail member 86 is further shifted in the lateral assembly direction 14 such that the pin members 64, 90 travel along the inclined surfaces 70, 128, thereby camming the rail member 86 downwardly so that the rail member 86 is urged into tight engagement with the upper mounting surface 10. The rail member 86 is shifted in the lateral assembly direction 14 until the center pin member 64 engages stop portions 78 of the tapered slots 74 of the central lug mount portions 42 and the end pin member 90 is positioned in the horizontal run portion 120 of the slot 92 of the depending legs 94 of the rail member 86, thereby defining the operative position 134 of the rail member 86. As a result, any spaces or gaps at the interface between the distal ends 104 of the legs 94 of the rail member 86 and the flat upper surface 10 of the elongate support member 12 are minimized, therefore reducing the spaces available for the debris accumulation.

To secure the rail member 86 in the operative position 134, the second end 112 of the rail member 86 is positively secured to the manual securing guide portions 40 of the elongate support member 12. As shown in FIGS. 3 and 19, the shaft 168 of a hitchpin 164 is inserted through the throughbores 58 of the manual securing guide portions 40 and the end apertures 118 of the legs 94 of the rail member 86 adjacent the second end 112 thereof. The hitch pin shaft 168 further includes a throughbore 170 extending therethrough adjacent the distal end 174 of the hitch pin 164. A cotter pin 176 is inserted into the throughbore 170 to restrict movement of the hitch pin 164 and secure the rail member 86 in place.

To remove the rail assembly 8, including the rail member 86 and cleaner blade assemblies 22, the cotter pin 176 is removed from the hitch pin 164 adjacent the second end 112 of the rail member 86. The hitchpin 164 is then removed from the rail member 86.

Figure 30:
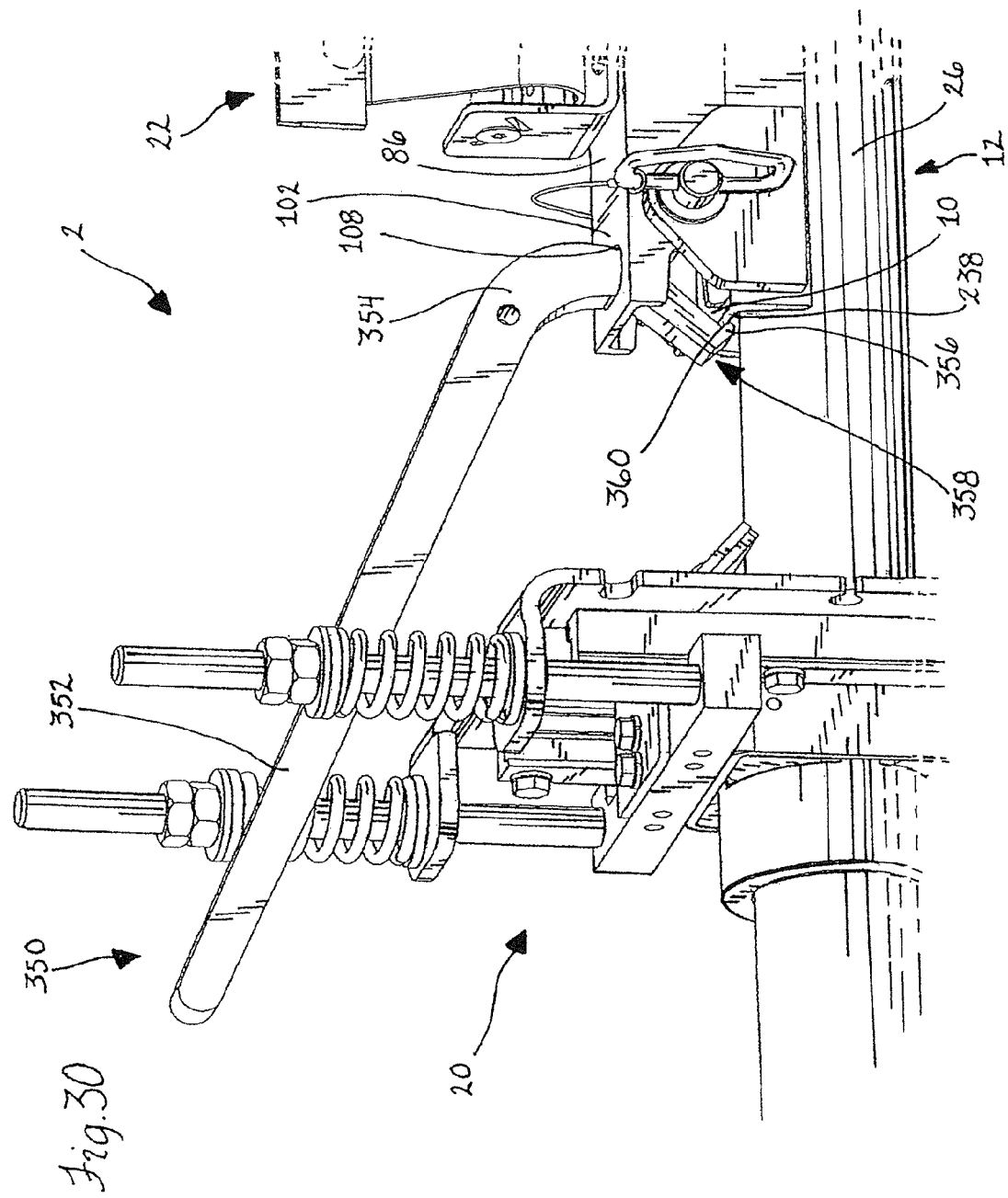
FIG. 30 is an enlarged perspective view of the removable cartridge cleaner assembly of FIG. 1 showing the elongate channel member removal tool extending through the web aperture of the elongate channel member and engaging the lower surface of the web of the base channel member of the elongate support assembly.

A rail member removal tool 350, as shown in FIG. 30, is the used to remove the rail member 86. The rail member removal tool 350 includes an elongate handle portion 352, a crook portion 354 and a lip portion 356 at the distal end 358 of the rail member removal tool 350. The distal end 358 of the tool 350 is inserted into the web end removal aperture 108 of the web portion 102 of the second end 112 of the rail member 86 and is positioned such that the upper surface 360 of the lip portion 356 engages the lower surface 238 of the web portion 28 of the base channel member 26 of the elongate support assembly 12. A downward force is exerted on the handle portion 352 of the tool 350, which causes the tool 350 to rotate around the point of engagement between the lip portion 356 and base channel member 26. As a result, the crook portion 354 disposed within the web end removal aperture 108 is engaged therewith and urges the rail member 86 in the removal direction 362 opposite the lateral assembly direction 14.

The configuration of the elongate rail member 86 and the elongate support assembly 12 ease in the removal of the rail member 86. In particular, by minimizing the areas of engagement between the elongate rail member 86 and the elongate support assembly 12, any force needed beyond the normal sliding of the rail member 86 is preferably limited to the initial shifting of the rail member 86 such that the pin members 64, 90 and tapered slots 74, 124 unengaged from one another. As a result, the leverage provided by the downward force of the rail member removal tool 350 is not required during the entire removal process.

As the rail member 86 is shifted in the removal direction 362 the central pin member 64 disengages the inclined surfaces 70 of the central lug mounting portions 42, and the inclined surfaces 128 of the openings 92 of the legs 94 of the first end 110 of the rail member 86 disengage the end pin member 90. The rail member 86 is then shifted in the removal direction 362 until the rail member 86 is completely removed from the flat upper surface 10 of the elongate support member 12. The rail member 86 is shifted such that the distal ends 104 of the flanges 94 of the rail member 86 shift along the upper surface 318 of the ramp member 304 up and away from the base channel member 26 and between the bracket legs 252 of the resilient mount 20.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A conveyor belt system comprising:
a conveyor belt traveling in a belt travel direction;
an elongate base member having a longitudinal axis and opposite ends, and extending lengthwise therebetween along the longitudinal axis below and across the conveyor belt;
a plurality of belt cleaner blade assemblies;
an elongate rail member having a longitudinal axis and configured for having the belt cleaner blade assemblies secured thereto and for being slidably mounted on the elongate base member in an installation direction generally orthogonal to the belt travel direction from one of the base member opposite ends toward the other end;
a laterally extending portion of one of the rail member and the base member that extends in a lateral direction orthogonal to the longitudinal axis of the one of the rail member and the base member; and
a wedge portion of the other one of the rail member and the base member that includes a surface that extends transversely and is inclined relative to the longitudinal axis of the other one of the rail member and the base member and which is disposed so that the laterally extending portion of the one of the base member and the rail member will engage the wedge portion surface of the other one of the base member and the rail member as the rail member is slidably mounted on the base member in the installation direction along the longitudinal axis of the elongate base member to urge the rail member toward the base member to minimize the accumulation of debris therebetween.

2. The conveyor belt system of claim 1 wherein the wedge portion comprises wedge portions of the base member are spaced to allow the rail member to be received therebetween.

3. The conveyor belt system of claim 1 wherein the rail member includes opposite thin depending legs configured to minimize contact between the rail member and the elongate base member.

4. The conveyor belt system of claim 1 wherein the rail member includes a wedge portion at one end thereof.

5. The conveyor belt system of claim 1 wherein the laterally extending portion comprises laterally extending portions of the rail member and the base member and the wedge portion comprises wedge portions of the rail member and the base member with the laterally extending portion and wedge portion of the rail member being separated by a first longitudinal distance therealong, and the laterally extending portion and wedge portion of the elongate base member being separated by a second longitudinal distance therealong approximately the same as the first longitudinal distance.

6. The conveyor belt system of claim 1 wherein the wedge portion comprises a tapered slot.

7. The conveyor belt system of claim 1 wherein the laterally extending portion comprises a pin.

8. The conveyor belt system of claim 1 wherein the rail member includes a pair of rail members each slidably mounted on the base member to extend from a generally central portion of the base member toward opposite ends thereof 9. The conveyor belt system of claim 1 including a pair of resilient mounts located out from under the conveyor belt and configured so that the opposite ends of the base member are mounted thereto.

10. The conveyor belt system of claim 9 wherein the resilient supports include a frame portion having a lower portion and two spaced, upwardly extending leg portions defining a slot therebetween configured to permit the rail member to pass therethrough.

* * * * *